US010035270B2

(12) United States Patent
Fay et al.

(10) Patent No.: US 10,035,270 B2
(45) Date of Patent: Jul. 31, 2018

(54) CONTACT SENSORS FOR A MOBILE ROBOT

(71) Applicant: iRobot Corporation, Bedford, MA (US)

(72) Inventors: Victor Fay, Andover, MA (US); Seth Blitzblau, Arlington, MA (US); Samuel Duffley, Billerica, MA (US); Kyle Dumont, Cambridge, MA (US); Justin H. Woodman, Chelmsford, MA (US)

(73) Assignee: iRobot Corporation, Bedford, MA (US)

( * ) Notice: Subject to any disclaimer, the term of this patent is extended or adjusted under 35 U.S.C. 154(b) by 63 days.

(21) Appl. No.: 15/349,237

(22) Filed: Nov. 11, 2016

(65) Prior Publication Data

US 2017/0072570 A1 Mar. 16, 2017

Related U.S. Application Data

(63) Continuation of application No. 14/728,406, filed on Jun. 2, 2015, now Pat. No. 9,505,140.

(51) Int. Cl.
*B25J 13/08* (2006.01)
*A47L 9/00* (2006.01)
(Continued)

(52) U.S. Cl.
CPC ............. *B25J 13/085* (2013.01); *A47L 9/009* (2013.01); *A47L 11/4061* (2013.01); *B25J 5/00* (2013.01);
(Continued)

(58) Field of Classification Search
CPC . B25J 31/085; B25J 5/00; B25J 9/1694; B25J 19/0075; A47L 9/009;
(Continued)

(56) References Cited

U.S. PATENT DOCUMENTS 3,995,696 A 12/1976 Kainer
5,903,124 A * 5/1999 Kawakami ........... G05D 1/0227
318/568.11
(Continued)

FOREIGN PATENT DOCUMENTS

DE 10357636 7/2005
DE 102007036223 2/2009
(Continued)

OTHER PUBLICATIONS

International Search Report and Written Opinion in International Application No. PCT/US2015/061775, dated Mar. 11, 2016, 14 pages.

(Continued)

*Primary Examiner* — Nicholas Kiswanto
(74) *Attorney, Agent, or Firm* — Fish & Richardson P.C.

(57) ABSTRACT

A robot includes a body and a bumper. The body is movable relative to a surface and includes a first portion of a sensor. The bumper is mounted on the body and movable relative to the body and includes a backing and a second portion of the sensor. The backing is movable relative to the body in response to a force applied to the bumper. The second portion of the sensor is attached to the backing and movable with the backing relative to the first portion of the sensor in response to a force applied to the bumper. The sensor is configured to output an electrical signal in response to a movement of the backing. The electrical signal is proportional to an amount of displacement of the second portion relative to the first portion.

21 Claims, 13 Drawing Sheets

(51) Int. Cl.
  *A47L 11/40* (2006.01)
  *B25J 5/00* (2006.01)
  *B25J 9/16* (2006.01)
  *B25J 19/00* (2006.01)
  *G01D 5/24* (2006.01)
  *G01L 1/14* (2006.01)
  *G01D 5/14* (2006.01)
  *G01D 5/20* (2006.01)

(52) U.S. Cl.
  CPC ......... *B25J 9/1694* (2013.01); *B25J 19/0075* (2013.01); *G01D 5/142* (2013.01); *G01D 5/20* (2013.01); *G01D 5/24* (2013.01); *G01L 1/14* (2013.01); *A47L 2201/04* (2013.01); *Y10S 901/01* (2013.01)

(58) Field of Classification Search
  CPC . A47L 11/4061; A47L 2201/04; G01D 5/142; G01D 5/20; G01D 5/24; G01L 1/14; Y10S 901/01
  See application file for complete search history.

(56) References Cited

U.S. PATENT DOCUMENTS

| | | | |
|---|---|---|---|
| 5,935,179 A | 8/1999 | Kleiner et al. | |
| 6,481,515 B1 * | 11/2002 | Kirkpatrick | A47L 11/03 15/319 |
| 6,594,844 B2 | 7/2003 | Jones | |
| 6,690,134 B1 | 2/2004 | Jones et al. | |
| 6,809,490 B2 | 10/2004 | Jones et al. | |
| 6,810,305 B2 * | 10/2004 | Kirkpatrick, Jr. | A47L 9/009 180/167 |
| 6,883,201 B2 | 4/2005 | Jones et al. | |
| D510,066 S | 9/2005 | Hickey et al. | |
| 6,956,348 B2 | 10/2005 | Landry et al. | |
| 7,024,278 B2 | 4/2006 | Chiappetta et al. | |
| 7,093,497 B2 | 8/2006 | Takenaka et al. | |
| 7,155,308 B2 | 12/2006 | Jones | |
| 7,332,890 B2 | 2/2008 | Cohen et al. | |
| 7,441,298 B2 | 10/2008 | Svendsen et al. | |
| 7,706,917 B1 | 4/2010 | Chiappetta et al. | |
| 8,087,117 B2 | 1/2012 | Kapoor et al. | |
| 8,364,309 B1 | 1/2013 | Bailey | |
| 8,386,081 B2 | 2/2013 | Landry et al. | |
| 8,521,329 B2 * | 8/2013 | Park | G05D 1/0227 700/245 |
| 8,706,297 B2 | 4/2014 | Letsky | |
| 8,954,192 B2 | 2/2015 | Ozick et al. | |
| 9,000,543 B2 | 4/2015 | Jeong et al. | |
| 9,008,835 B2 | 4/2015 | Dubrovsky et al. | |
| 8,972,052 B2 | 5/2015 | Chiappetta | |
| 9,031,700 B2 | 5/2015 | Payne et al. | |
| 9,126,336 B2 | 9/2015 | Eakins | |
| 9,151,776 B2 | 10/2015 | Jeong et al. | |
| 9,349,552 B2 | 5/2016 | Huska | |
| 2001/0054895 A1 | 12/2001 | Graff | |
| 2003/0045205 A1 | 3/2003 | Herb et al. | |
| 2006/0191096 A1 * | 8/2006 | Sudo | A47L 9/009 15/319 |
| 2008/0091305 A1 | 4/2008 | Svendsen et al. | |
| 2008/0276407 A1 * | 11/2008 | Schnittman | A47L 11/34 15/319 |
| 2009/0055124 A1 | 2/2009 | Herchen et al. | |
| 2009/0277476 A1 * | 11/2009 | Hammond | A47L 9/009 134/18 |
| 2009/0281661 A1 | 11/2009 | Dooley et al. | |
| 2010/0049364 A1 | 2/2010 | Landry et al. | |
| 2012/0265391 A1 | 10/2012 | Letsky | |
| 2012/0308409 A1 | 12/2012 | Levine | |
| 2013/0057303 A1 | 3/2013 | Kaltner | |
| 2013/0174371 A1 | 7/2013 | Jones et al. | |
| 2014/0012418 A1 | 1/2014 | Johnson et al. | |
| 2015/0020326 A1 | 1/2015 | Schnittman et al. | |
| 2015/0073598 A1 | 3/2015 | Rosenstein et al. | |
| 2015/0266184 A1 | 9/2015 | Arakawa | |
| 2016/0051104 A1 * | 2/2016 | Shin | A47L 11/4072 15/3 |
| 2016/0167241 A1 | 6/2016 | Goldfarb | |
| 2017/0072570 A1 | 3/2017 | Fay et al. | |
| 2017/0156560 A1 * | 6/2017 | Jung | A47L 9/2805 |

FOREIGN PATENT DOCUMENTS

| | | |
|---|---|---|
| DE | 102013107160 | 1/2015 |
| EP | 0382693 | 8/1990 |
| EP | 1582957 | 10/2005 |
| EP | 2228704 | 9/2010 |
| WO | 0106905 | 2/2001 |
| WO | 2002084875 | 10/2002 |
| WO | 2009042692 | 4/2009 |
| WO | 2012123144 | 9/2012 |

OTHER PUBLICATIONS

European Search Report issued in European Application No. 15195632.3 dated Oct. 7, 2016, 5 pages.
International Preliminary Report on Patentability in International Application No. PCT/US2015/061775, dated Dec. 14, 2017, 8 pages.

* cited by examiner

CONTACT SENSORS FOR A MOBILE ROBOT

CROSS-REFERENCE TO RELATED APPLICATIONS

This application is a continuation application of and claims priority to U.S. application Ser. No. 14/728,406, filed on Jun. 2, 2015, the entire contents of which are hereby incorporated by reference.

TECHNICAL FIELD

This specification relates generally to contact sensors for a mobile robot.

BACKGROUND

A mobile robot operates by navigating around an environment. The mobile robot can include a bumper, which contacts obstacles that the mobile robot encounters in its travels. The mobile robot can modify its behavior in response to detecting that the bumper has contacted an obstacle in the environment. For example, the mobile robot can back-away from the obstacle, or otherwise alter its path. In some mobile robots, the bumper includes mechanical switches that provide a binary indication of whether the bumper has made contact with an obstacle.

SUMMARY

A bumper for a mobile robot can detect contact with obstacles in an environment using sensors that detect movement of the bumper. For example, each sensor may be a capacitive sensor having one plate movably mounted so that the plate moves along with the bumper relative to the chassis, and another plate mounted so that it is stationary relative to the chassis. Movement of one plate relative to another, due to the movement of the bumper, causes the capacitive sensor to output an electrical signal having a magnitude or value proportional to the distance between the plates. Thus, the electrical signal varies within a range of values according to the movement of the bumper. A controller interprets the electrical signals generated by the sensors to determine attributes of a force applied to the bumper, such as a location, magnitude, and duration of the force. Various systems are described herein for detecting contact with, forces on, and displacement of bumpers used in mobile robots.

In one aspect, a robot includes a body and a bumper. The body is movable relative to a surface and includes a first portion of a sensor. The bumper is mounted on the body and movable relative to the body and includes a backing and a second portion of the sensor. The backing is movable relative to the body in response to a force applied to the bumper. The second portion of the sensor is attached to the backing and movable with the backing relative to the first portion of the sensor in response to a force applied to the bumper. The sensor is configured to output an electrical signal in response to a movement of the backing. The electrical signal is proportional to an amount of displacement of the second portion relative to the first portion.

In some cases, the sensor includes a capacitive sensor. The first portion can include a first plate of the capacitive sensor. The second portion can include a second plate of the capacitive sensor. The electrical signal can vary proportionally to an amount of displacement of the first plate relative to the second plate. The backing can include rigid regions that are interconnected by flexible regions. At least one of the rigid regions can include a post that extends toward the body and through a hole in the body. The second plate can be attached to the post on a side of the body facing away from the backing. The second plate can be movable with the post relative to the first plate. In some examples, a displacement of the first plate relative to the second plate can include a horizontal displacement parallel to the surface, and the electrical signal can vary proportionally to an amount of the horizontal displacement. In some examples, a displacement of the first plate relative to the second plate can include a vertical displacement perpendicular to the surface, and the electrical signal can vary proportionally to an amount of the vertical displacement.

The bumper can be movable between a compressed position and an uncompressed position. In some cases, in the uncompressed position, the first plate can touch the second plate and, in the compressed position, motion of the post through the hole can result in a separation between the first plate and the second plate. In some examples, in the uncompressed position, a distance between the first plate and the second plate is less than the distance between the first plate and the second plate in the compressed position.

In some examples, the first plate of the capacitive sensor can be attached to the body on a surface of the body facing towards the backing, and the second plate can be attached to the backing on a side of the backing facing towards the body. A dielectric can be between the first plate and the second plate. The robot can include a spacer having a thickness. In some implementations, the spacer can connect the first plate to the body. The space can be between the first plate and the body. In some implementations, the spacer can connect the second plate to the backing and can be between the second plate and the backing.

The backing can include an integrated structure having a substantially constant rigidity across an entirety of the integrated structure. The bumper can have a shape that is substantially rectangular. The bumper can include a skin over at least part of the backing, the skin comprising shock-absorbing material.

In some examples, the sensor can include an inductive sensor, the first portion of the sensor can include a winding of the inductive sensor, the second portion can include a core of the inductive sensor, and the electrical signal can vary proportionally to an amount of displacement of the winding relative to the core.

In other examples, the first portion of the sensor can include a Hall effect sensor, the second portion of the sensor can include a magnet, and the electrical signal can vary proportionally to an amount of displacement of the magnet relative to the Hall effect sensor.

In another aspect, a robot includes a body, a bumper, a first sensor, a second sensor, and a controller. The body is movable relative to a surface. The bumper is mounted on the body and movable relative to the body. The bumper includes a backing movable relative to the body in response to a force applied to the bumper. The first sensor outputs and/or is configured to output a first electrical signal that varies with an amount of the movement of the bumper. At least part of the first sensor is mounted to the backing. The second sensor outputs and/or is configured to output a second electrical signal that varies with the amount of the movement of the bumper. At least part of the second sensor is mounted to the backing. The controller receives and/or is configured to receive the first electrical signal and the second electrical signal. The controller determines and/or is configured to determine one or more attributes of the force applied to the bumper based on the first electrical signal and the second electrical signal.

The backing can include multiple segments. The multiple segments can include a first segment and a second segment. The at least part of the first sensor can be mounted to the first segment. The at least part of the second sensor can be mounted to the second segment. The multiple segments can be interconnected by connection elements to form an integrated structure. The connection elements can have greater flexibility than flexibilities of the multiple segments. The connection elements can include a same material as the multiple segments. Thicknesses of the connection elements can be less than thicknesses of the multiple segments. At least some of the multiple segments can be disconnected from others of the multiple segments.

In some examples, the one or more attributes can include a location of the force applied to the bumper. The one or more attributes can include a magnitude of the force applied to the bumper. The one or more attributes can include a frequency of the force applied to the bumper, a duration of the force applied to the bumper, and/or a dynamic response of the force applied to the bumper.

The controller can be configured to execute instructions to determine the one or more attributes by performing one or more interpolation processes based on the first and second electrical signals.

The backing can have a first side that is in series with, and angled relative to, a second side. The backing can include a first segment aligned to the first sensor on the first side and a second segment aligned to the second sensor on the second side. The first segment can be connected to the second segment by a connection element having a length that is greater than a length from the first segment along the first side to the second segment along the second side. The connection element can be angled away from the first segment at the first side. The connection element can be angled away from the second segment at the second side. The connection element can be curved relative to a pathway along the first side and the second side. The backing can have a substantially rectangular shape. The first side and the second side can be adjacent sides of the substantially rectangular shape.

In some examples, the first and/or the second electrical signal can vary linearly with the movement of the bumper. In some examples, the first and/or the second electrical signal can vary non-linearly with the movement of the bumper.

Advantages of the foregoing may include, but are not limited to, the following. The sensors generate electrical signals that indicate a degree of force caused by contact with objects in the environment, thereby not only allowing the controller to detect whether the bumper has made contact with an object in the environment but also allowing the controller to determine the location of forces on the bumper, the magnitude of forces on the bumper, and other attributes of forces on the bumper. In response to detecting contact and determining attributes of the contact, the controller can adjust navigational behaviors to avoid obstacles in the environment. The sensor system, which can also detect overhead obstacles, reduces the likelihood that the robot will become stuck between overhanging obstacles and a floor surface. Due to, in part, the high sensitivity of the sensors, the bumpers using the sensors described herein can reduce the number of movable components visible to a user of the robot. Additionally, due to, in part, the high sensitivity of the sensors a small displacement (e.g., 1-3 mm) of the movable components of the bumper can be accurately measured by the system allowing the total amount of movement of the movable components to be reduced in comparison to, for example, mechanical switch based bumpers. The sensors can be designed to achieve different degrees of reactivity to forces along the bumper, which can improve operation of the robot.

Any two or more of the features described in this specification, including in this summary section, can be combined to form implementations not specifically described herein.

The robots, or operational aspects thereof, described herein can be implemented as/controlled by a computer program product that includes instructions that are stored on one or more non-transitory machine-readable storage media, and that are executable on one or more processing devices to control (e.g., to coordinate) the operations described herein. The robots, or operational aspects thereof, described herein can be implemented as part of a system or method that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are example robots configured to traverse (or to navigate) surfaces, such as floors, carpets, turf, or other materials and perform various operations including, but not limited to, vacuuming, wet or dry cleaning, polishing, and the like. These robots can encounter obstacles, which can impede their progress. For example, during operation, a robot may contact an obstacle, such as a chair or a wall. The robot determines that it has made contact with the obstacle based on a force resulting from contact between a bumper on the robot and the obstacle. A controller identifies this force based on signals output by sensors, which detect movement of the bumper in response to the force.

The sensors may employ various appropriate sensing technologies. For example, a capacitive sensor may be used, in which one plate of the capacitor is stationary relative to the chassis and another plate of the capacitor moves along with the bumper relative to the chassis. The bumper can move in response to contact with the obstacle. The capacitive sensor outputs electrical signals that are proportional to displacement of the plates resulting from the bumper movement. These electrical signals can be interpreted (e.g., processed) by the controller to identify attributes of a force of the contact, such as a location of the force and a magnitude of the force. Capacitive sensors, such as those described herein and the other types of sensors also described herein, can be advantageous because they can generate a range of electrical signals in response to contact and thus can provide improved obstacle detection.

Figure 1:
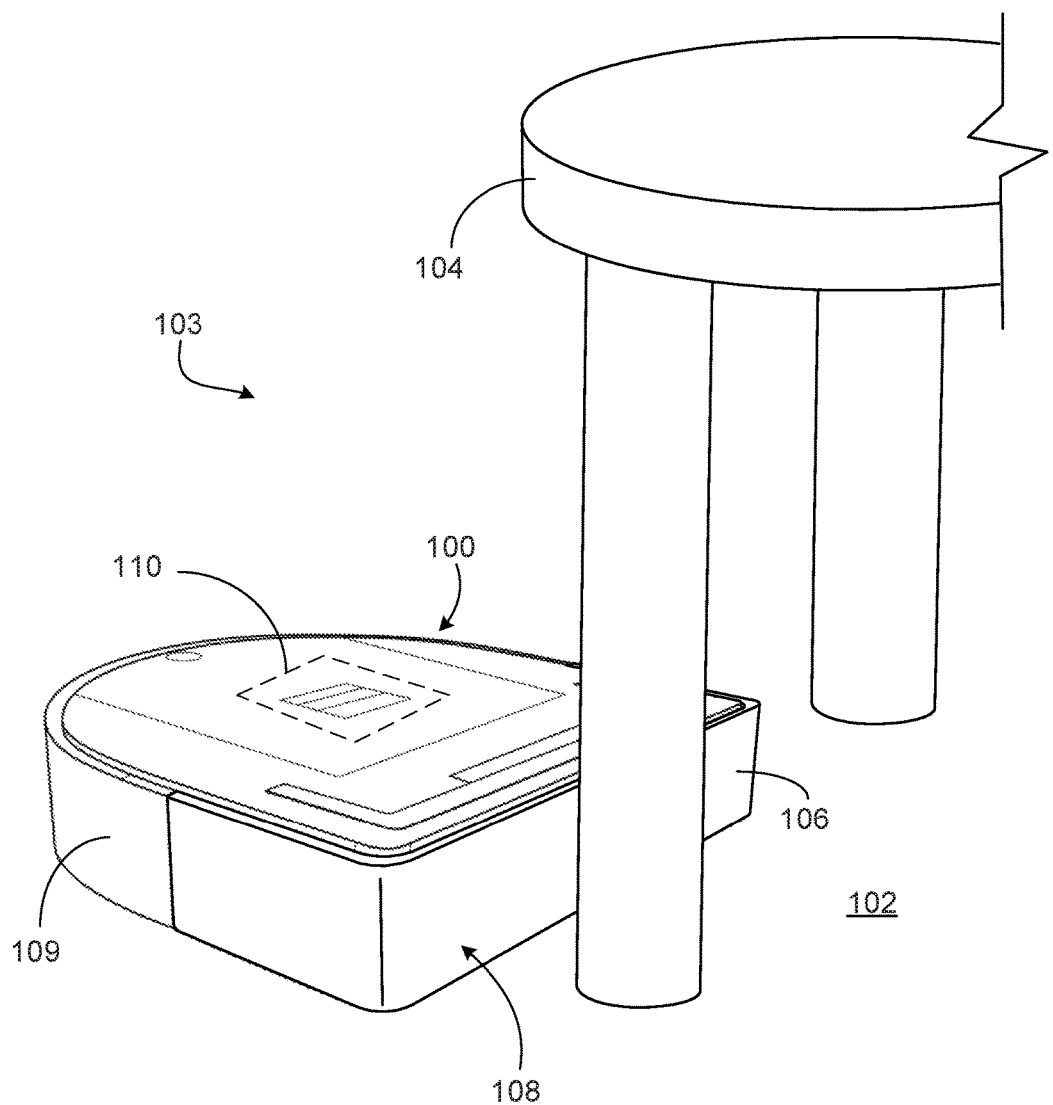
FIG. 1 is a perspective view of a mobile robot contacting an obstacle on a floor surface.

FIG. 1 shows an example of a mobile robot 100 (also referred to as robot 100) that can detect contact with obstacles in the environment and determine attributes of that contact. In operation, robot 100 navigates along a floor surface 102 in environment 103 and can contact obstacles, such as vertically-oriented surfaces, overhead surfaces, or other surfaces that can impede movement of the robot 100. During movement, a bumper 106 located at the front of the robot 100 (relative to the direction of its movement) contacts a chair 104. As the robot 100 contacts the chair 104, sensors in the robot 100 generate and output electrical signals, which may be proportional to the amount of movement of the bumper 106. A controller 110 in the robot 100 receives these electrical signals and uses them to determine one or more attributes of the force, such as, a magnitude of the force, a direction of the force, a location of the force, or a duration of the force. Information such as the direction and the location of the force can be used to determine the location of an obstacle in the environment 103 relative to the robot 100. The controller 110 can issue navigational and drive commands based on a determination of the one or more attributes of the force. For example, the navigational and drive commands may instruct, and cause, the robot to avoid continued contact with the chair, to navigate along the chair, to decrease a forward velocity, or to perform other actions in response to detecting the contact with the chair 104.

Figure 2:
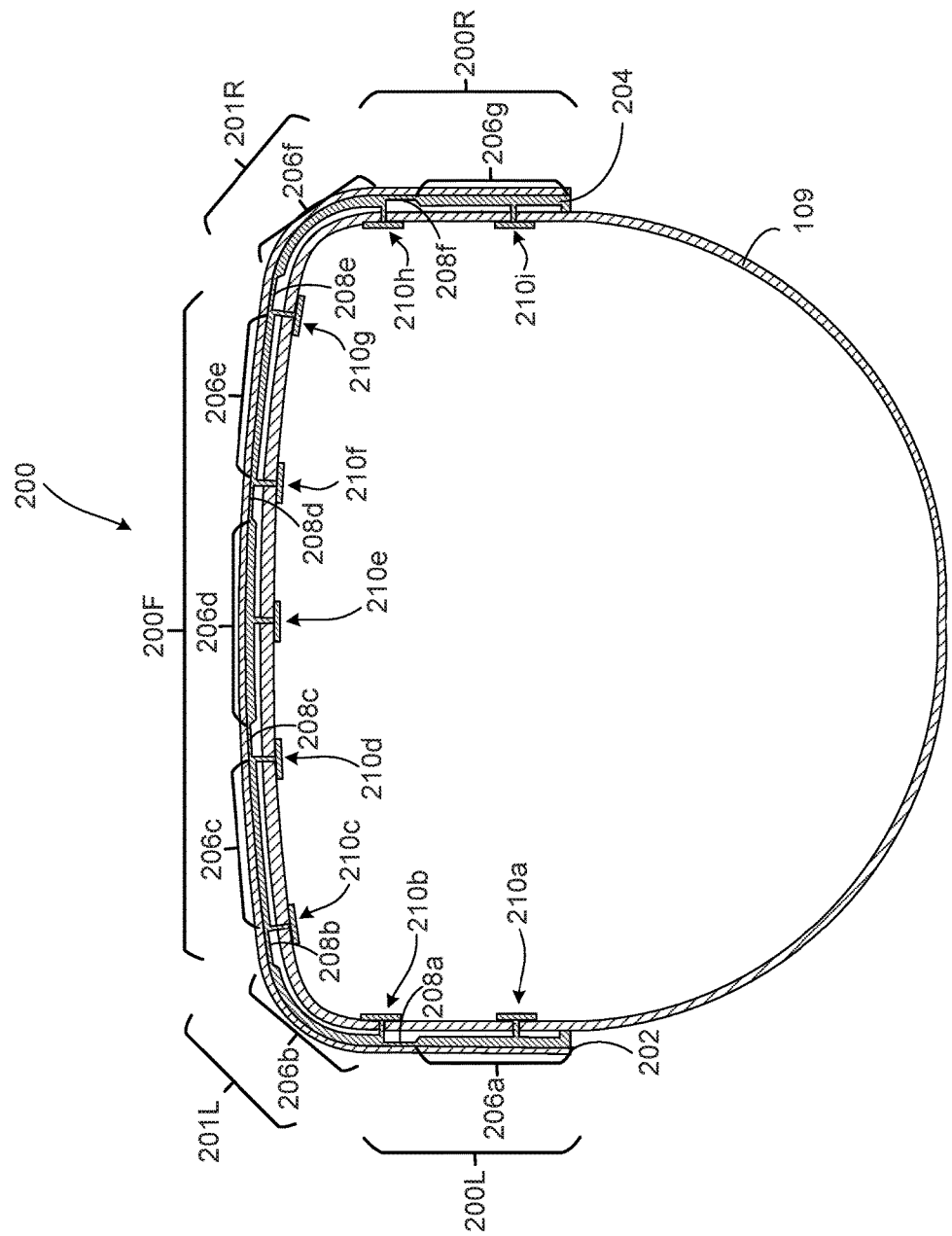
FIG. 2 is a top cross-sectional view of a mobile robot including a bumper having capacitive sensors.
Figure 3:
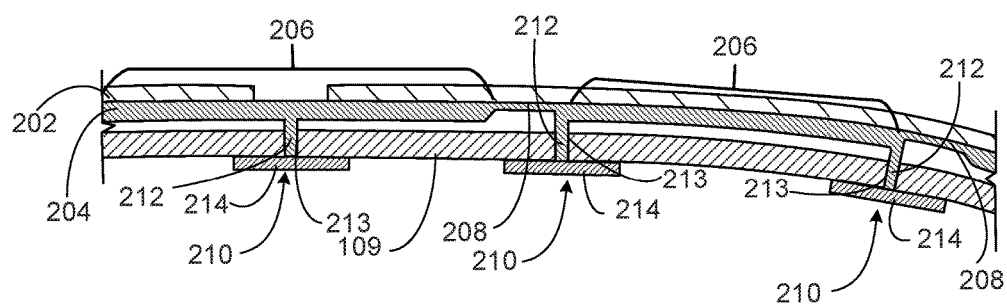
FIG. 3 is an enlarged view of a portion of the bumper of FIG. 2.

FIGS. 2 and 3 show an example structure of a bumper 200 that can be mounted on the robot body 109. In this example, the bumper 200 is generally rectangular in shape. Bumper 200 is mounted onto the front portion 108 of the robot, and includes a front side 200F, a right lateral side 200R, and a left lateral side 200L. A left corner section 201L can connect the front side 200F and the left lateral side 200L, and a right corner section 201R can connect the front side 200F and the right lateral side 200R. The front side 200F and the lateral sides 200R, 200L can be substantially perpendicular to one another, thus forming a partially (e.g., frontally) rectangular shape. The front side 200F can have a length between, for example, 15 cm and 30 cm, 30 cm and 45 cm, or 45 cm to 60 cm. The lateral sides 200R, 200L can each have a length between, for example, 5 cm and 15 cm, 15 cm and 25 cm, or 25 cm and 35 cm. In general, the front side 200F can extend across the whole width of the robot and can be equal to the robot's width and the lateral sides 200R, 200L can be between ¼ and ½ of the length of the robot. For example, the lateral sides 200R, 200L can have a length of between ¼ and ⅓ of the length of the robot.

While the bumper 200 has been described to be partially rectangular, it may have other shapes as described herein. In some implementations, the angle between the front side 200F and the lateral sides 200R, 200L is any appropriate angle, examples of which include, but are not limited to, angles between, e.g., 85 and 95 degrees, 80 and 100 degrees, or 75 and 105 degrees. For any of the implementations described herein, the front portion 108 of the robot body may be partially circular, semi-circular, triangular, Realeaux triangular, spline shaped, or have any other appropriate shape. In these cases, the bumper 200 may have a different geometry than the generally rectangular shape described herein.

The structure of the bumper 200 transmits force resulting from contact such that sensors within the bumper 200 can generate electrical signals based on the force. In particular, the sensors described herein can be used to detect a vertical force, a horizontal force, or a combination thereof applied on the bumper 200. Referring to FIG. 2, the bumper 200 includes a skin 202 at least partially (in this example, fully) covering a backing 204. The backing 204 is located in between the robot body 109 and the skin 202. The skin 202 serves as the outer surface of the bumper 200 and comes into direct contact with objects located in the environment 103. Thus, when the skin 202 contacts objects in the environment 103, the skin 202 deforms, pushing the backing 204 towards robot body 109. Movement of the backing 204 thus causes capacitive sensors 210a-210j (collectively referred to as capacitive sensors 210) of the bumper 200 to generate electrical signals in response to the movement of the backing 204. In some implementations, the displacement of the backing 204 relative to the robot body 109 is within an interval of, for example, 0 mm and 5 mm, 0 mm and 15 mm, and 0 mm and 25 mm. Due to, in part, the high sensitivity of the sensors, in some examples, the displacement of the backing 204 relative to the robot body 109 is limited to between 1 mm and 5 mm to provide a bumper that appears to be generally stationary to the observer.

The material of components of the bumper 200 may vary based on functions of the components. The skin 202 can be a soft, flexible material that allow forces applied to the outer surface of the bumper 200 that deform the skin 202 to be distributed relatively narrowly over small regions of backing 204. For example, the skin 202 can be an elastomeric material or rubber material, such as polychloropene, ethylene propylene diene rubber, a polyolefin thermoplastic elastomer or thermoplastic vulcanite. The skin 202 can have a low modulus of elasticity, e.g., 0.01 MPa to 1 MPa, 1 MPa to 10 MPa, or 10 MPa to 100 MPa. In some implementations, the skin 202 is a single integrated element; however, the skin can be made of two separate pieces split at the front side 200F of the bumper 200, each covering one of the lateral sides 200R, 200L of the bumper 200.

All, or part, of the backing 204 can be made of a material that is more rigid than the skin 202. For example, the backing can made of be a rigid polymer, such as polycarbonate, acrylonitrile butadiene styrene, or nylon; or the backing can be made of sheet metal, such as stainless steel and copper steel. In one particular example, the backing is made of though copper plated steel. In operation, the robot 100 contacts objects in the environment 103, and the skin 202 deforms and transfers force to the backing 204, which reacts to the force by moving relative to the robot body 109. The skin 202 and the backing 204 of the bumper 200 can have geometries similar to the underlying portions of the robot body 109. As a result, the skin 202 and the backing 204 together can be partially rectangular in shape.

The robot 100 includes a sensor system, which can detect contact with objects in the environment 103. In this example, the sensor system includes the capacitive sensors 210 located along the bumper 200. The capacitive sensors 210 output electrical signals in response to movement of the backing 204 (which moves when force is applied to the bumper 200). Each electrical signal can be, for example, a current, a voltage, or some other appropriate signal that can vary with capacitances of the capacitive sensors 210. The capacitive sensors 210 can be positioned on the front side 200F of the bumper 200, the right lateral side 200R of the bumper 200, and/or the left lateral side 200L of the bumper 200. The number of capacitive sensors 210 and the distribution of the capacitive sensors 210 along the length of the bumper 200 allow the sensor system to detect contact from multiple locations along the front of and the side of the robot 100. For example, the capacitive sensors 210a, 210b, 210h, 210i respond to contact with objects on the lateral sides 200R, 200L of the bumper 200, while the capacitive sensors 210c to 210g along the front side 200F of the bumper 200 respond to the contact with objects on the front side 200F of the bumper 200.

The structure of the backing 204 can be selected to modulate reactivity of the capacitive sensors 210 to forces at various locations along the bumper 200. Reactivity includes an amount of change in electrical signal per a change in a parameter, e.g., a magnitude of a force on a portion of the bumper 200. Thus, a capacitive sensor 210 having a higher force reactivity results in a greater amount of change in electric signal in response to a unit increase in force than a capacitive sensor having a lower force reactivity.

The backing 204 can include rigid regions connected to one another by other, less rigid, regions (referred to herein as flexible regions) such that capacitive sensors 210 exhibit a greater reaction to forces localized on the rigid regions to which they are attached. For example, as shown in an enlarged view of a portion of the bumper 200 in FIG. 3, the backing 204 can include multiple segments 206a to 206g (each shown in FIG. 2 and collectively referred to as segments 206 in FIG. 3) that are interconnected by connecting elements 208a to 208f (each shown in FIG. 2 and collectively referred to as connecting elements 208 in FIG. 3). The connecting elements 208 are the flexible regions, and can have a greater flexibility/lower stiffness than the segments 206.

In the example of FIG. 3, the connecting elements 208 and the segments 206 are made of the same material. The connecting elements 208 have thicknesses that are less than the thicknesses of the segments 206, making the connecting elements 208 more flexible than the segments 206. In some implementations, the connecting elements 208 may be made of a material that is different than, and more flexible than, the segments 206. In such implementations, the thicknesses of the segments 206 and the connecting elements 208 may be about the same or there may be less difference in thickness than if the two were made of the same material. For example a ratio of the thickness of the segment 206 to the connecting element 208 can be between 1.1 and 2, 2 and 4, 4 and 6, or 6 and 8. The segments 208 can have a thickness between, for example, 1 mm and 2 mm, 2 mm and 3 mm, or 3 mm and 4 mm.

The multiple segments 206 and the connecting elements 208 form an integrated structure and, therefore, can be manufactured as a single piece. In other implementations, segments and connecting elements are made of multiple pieces.

By way of example, a force on each of the segments 206 is substantially isolated to a forced segment because the segments 206 are connected by the flexible elements 208. The forced segment is further depressed than unforced segments. As a result, the capacitive sensors 210 respond more to forces on the segments 206 to which they are directly attached and respond less (or not at all, depending upon the level of isolation) to forces on the segments 206 to which they are not directly attached. In some implementations, to achieve this operation, the stiffness of the connecting elements 208 is lower than the stiffness of the segments 206 so as to reduce the transfer of forces between segments 206. As described herein, the electrical signals generated by the capacitive sensors 210 thus can be used to estimate locations of forces along the bumper 200 due to the different electrical response of the capacitive sensors 210 to forces at different locations along the bumper.

Figure 4:
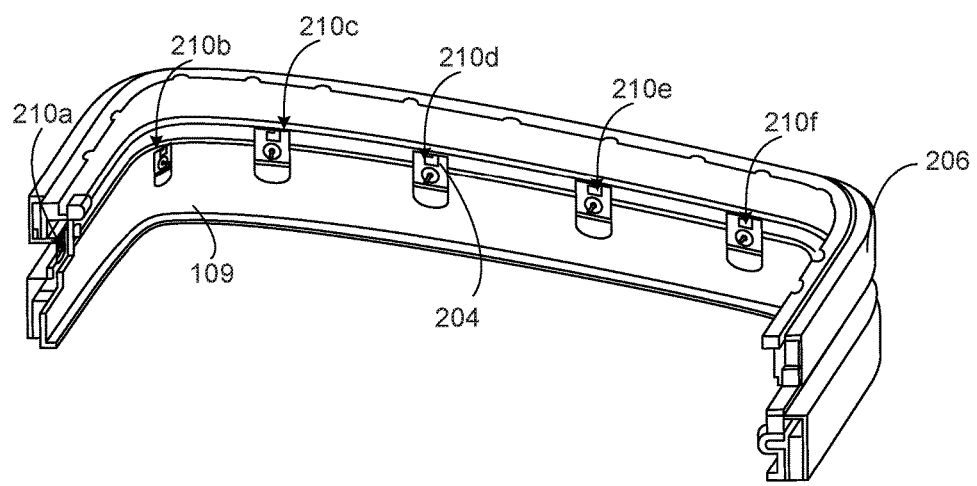
FIG. 4 is a perspective view of the bumper of FIG. 2 separated from the mobile robot.
Figure 5:
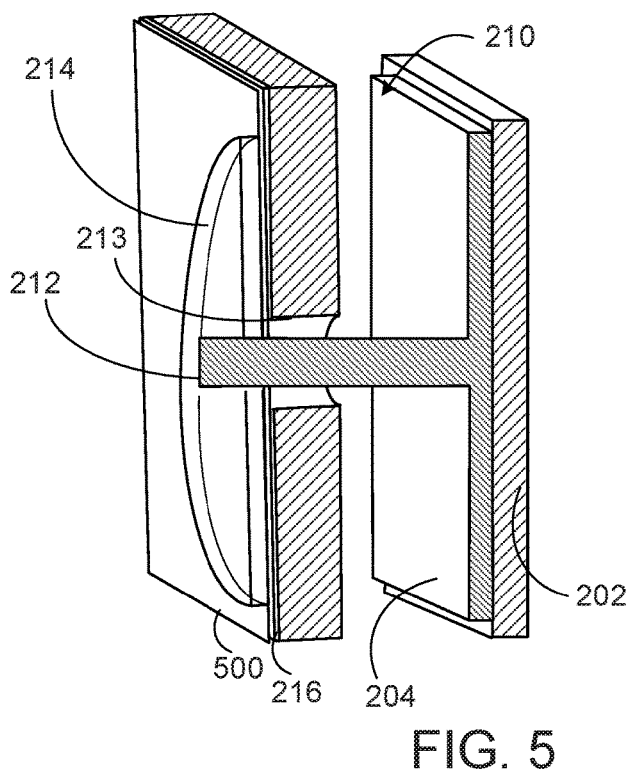
FIG. 5 is a side perspective cross-sectional view of a capacitive sensor.

As described elsewhere herein, the capacitive sensor 210 generates electrical signals in response to movement of plates of the capacitive sensor 210 relative to one another. In the example of FIGS. 3 to 5, each capacitive sensor 210 includes a plate 216 that is stationary and a plate 214 that is movable along with the bumper 200. The stationary plate 216 is mounted to the part of the body that faces away the backing 204. The movable plate 214 is mounted to a post 212 that is connected to a (rigid) segment of backing 204. Post 212 may be connected to, or constitute an integrated part of, segment 206. Post 212 connects to the movable plate 214 through a hole 213 in body 109. As a result of this connection, movement of the segment 206 is transferred to the post 212, and that movement is then transferred to the movable plate 214. Thus, in operation, in response to force applied to the bumper 200, the segment 206 moves, causing the post 212 to move, in turn causing the movable plate 214 to move away from the stationary plate 216. Motion of the post 212 through the hole 213 thus results in a separation between the movable plate 214 and the stationary plate 216. The resulting displacement of the plates 214, 216 results in a change in capacitance of the capacitive sensor 210. This change in capacitance is reflected by output of an electrical signal that is proportional to the displacement, and thus the movement.

The electrical signal generated by the capacitive sensor 210 can change relative to a baseline electrical signal. When there is no force applied, in which case the bumper 200 is in an uncompressed position, the plates 214, 216 touch or are otherwise closer together than when a force is applied. The resulting electrical signal serves as the baseline electrical signal against which movement of the plates is measured.

The movable plate 214 and the stationary plate 216 can be, for example, copper plates, thin-film metallic coated plates, or include some other appropriate conductive material. Dielectric 500 between the plates 214, 216 can be, for example, air, glass, ceramic, or some other insulating material. For example, if the plates touch when no force is applied, the dielectric will be air. However, if there is some baseline separation between the plates, other dielectrics (and air) may be used. The movable plate 214 may be circular, rectangular, or any other appropriate shape. The stationary plate 216 may be a shape that complements the shape of the movable plate 214 (e.g., circular, rectangular, or any other appropriate shape). In some cases, the movable plate 214 may be a circular shape defined by a radius between 5 mm and 35 mm (e.g., between 5 mm and 15 mm, between 15 mm and 25 mm, or between 25 mm and 35 mm). The stationary plate may be a circular shape defined by a radius that is between, for example, 5 mm and 15 mm, 15 mm and 25 mm, or 25 mm and 35 mm. In the cases where the movable plate 214 is a rectangular shape, the movable plate 214 can have a length and width between 5 mm and 35 mm (e.g., between 5 mm and 15 mm, between 15 mm and 25 mm, or between 25 mm and 35 mm). In some examples, the movable plate can be a rectangular plate with a length to width ratio of between 1.5:1 and 2:1. In one particular example, the length of the plate can be between about 15-25 mm and the width of the plate can be between about 5-15 mm.

Figure 6:
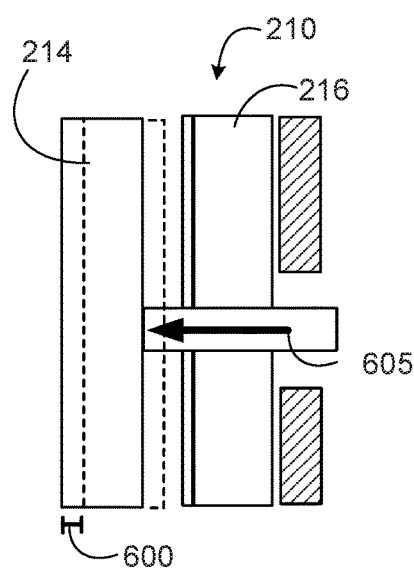
FIG. 6 is a side cross-sectional view of the capacitive sensor FIG. 5.

FIG. 6 shows a schematic side view of an example of capacitive sensor 210, including the movable plate 214 and the stationary plate 216. As shown in FIG. 6, the displacement of the movable plate 214 can include a horizontal displacement 605 that is generally parallel to the floor surface about which the robot 100 navigates. For example, when the bumper 200 contacts a vertical surface extending from the floor surface, the displacement can include displacement in the horizontal direction, thus causing the horizontal displacement 605. Thus, when the bumper 200 is in the uncompressed position, a horizontal distance 600 between the movable plate 214 and the stationary plate 216 is less than the horizontal distance 600 between the movable plate 214 and the stationary plate 216 when the bumper 200 is in a compressed position.

The capacitance of the capacitive sensors is a parameter that varies over a continuous range. The capacitive sensors can thus generate an analog electrical signal based on the capacitance. As indicated, the electrical signal can be a voltage, a current, a frequency (caused by an RC circuit), or other appropriate electrical signal that changes with the capacitance. As the horizontal distance 600 increases, the capacitance of the capacitive sensor 210 decreases. As the horizontal distance 600 decreases, the capacitance of the capacitive sensor 210 increases. The continuous range of the capacitance varies according to variations of the horizontal distance 600 between the uncompressed position and the compressed position. The electrical signal indicative of the capacitance can be proportional to the horizontal displacement 605. In an example, the electrical signal of the capacitance can be inversely proportional to the horizontal displacement 605.

Figure 7:
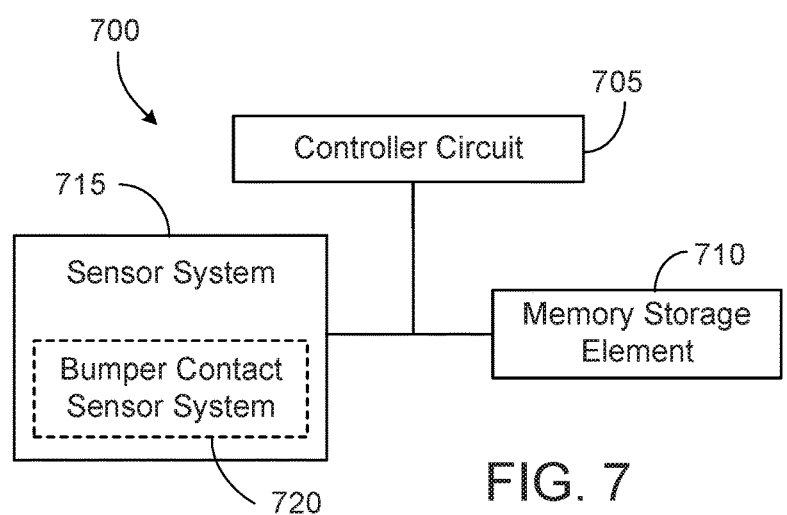
FIG. 7 is a block diagram of a mobile robot control system.

FIG. 7 shows an example of a control system 700 that may be included in robot 100 to, for example, determine attributes of forces on the bumper 200 of the robot 100 and navigate the robot 100. The control system 700 includes a controller circuit 705 (herein also referred to as the controller 705) operable with a memory storage element 710 and a sensor system 715. The controller 705 receives electrical signals generated by sensors of the sensor system 715 on the robot 100 and can select and issue drive commands, navigational commands, and other behavioral commands based on the electrical signals. The sensor system 715 includes a bumper contact sensor system 720 that includes, for example, the capacitive sensors 210 described herein. In conjunction with electrical signals received from the sensor system 715, the controller 705 can detect obstacles and implement behaviors to avoid the obstacles.

The controller 705 can access the memory storage element to execute signal processing routines that are stored on the memory storage element 710. The memory storage element 710 can store interpolation routines, static sensor calibration values, and low-pass filtering routines that can allow the controller 705 to better determine characteristics of the electrical signals. The interpolation routines can be used to determine attributes of forces from obstacles in the environment. The controller 705 can use static sensor calibration values to determine a magnitude of a force corresponding to magnitudes of electrical signals from the bumper contact sensor system 720. The controller 705 can use low-pass filtering routines to set a resolution for the bumper contact sensor system 720. In some implementations, the controller can implement a filtering routine to set a frequency resolution of the bumper sensors. A high-pass filtering routine can be set so that the controller determines that contact has been made if forces on the bumper exceed a frequency of 0.1 Hz to 0.5 Hz, 0.5 Hz to 2 Hz, or 2 Hz to 5 Hz. The high pass filtering can be beneficial to allow the system to sense forces exceeding a frequency.

Referring back to FIG. 2, each of the capacitive sensors 210a to 210i can independently generate electrical signals in response to the bumper 200 contacting objects in the environment 103. When the bumper 200 is in the uncompressed position, which generally indicates that the bumper 200 is not contacting an object in the environment and is not acted upon by an applied force, the capacitive sensors 210a to 210i generate similar electrical signals that controller 705 can interpret as baseline neutral signals indicative of the bumper 200 being in the uncompressed position. Thus, as the robot 100 navigates about the environment 103 without contacting objects in the environment 103, the controller 705 can dynamically calibrate each of the capacitive sensors 210a to 210i to these neutral signals. A change (referred to as an electrical response) in the electrical signal from the baseline neutral signals can be indicative of compression a portion of the bumper 200.

Figure 8A:
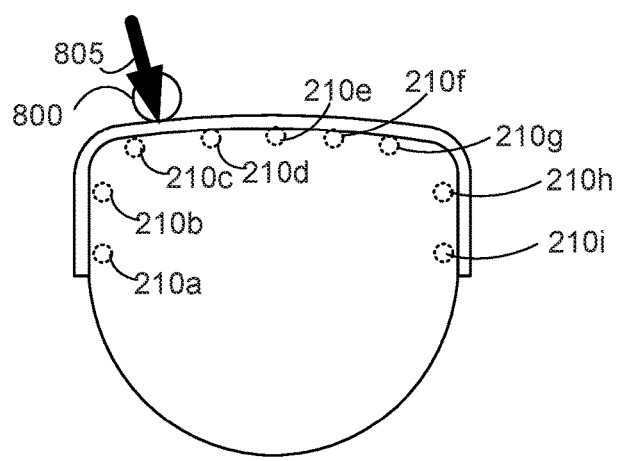
FIG. 8A is a top view of the mobile robot of FIG. 2 making contact with an object.

FIG. 8A shows robot 100 contacting an object 800 that applies a force 805, parallel or substantially parallel to the floor surface, on the bumper 200 of the robot 100. In response to the force 805, the bumper 200 moves, causing the segments 206 of the backing 204 to move, which results in electrical signals output by the capacitive sensors 210. The force 805 can include attributes, such as a magnitude, a direction, and a location along the bumper 200.

Each of the capacitive sensors 210a to 210i can generate an electrical signal that can vary in voltage, current, or other property of the electrical signal depending on the attributes of the force. The reaction of the capacitive sensors 210 to the force can vary based on a location of the force 805. For example, as the distance between the location of the force 805 and the location of the capacitive sensor 210 increases, the displacement caused by the force 805 decreases. Thus, each of the capacitive sensors 210 generates electrical signals depending on the location of the force 805. When the force 805 acts upon the bumper 200, the closer the location of the force 805 is to the given capacitive sensor 210, the greater is the electrical response produced by the capacitive sensor. In some examples, the closer the capacitive sensor 210 is to the location of the force 805, the greater is the reaction of the capacitive sensor 210 to the magnitude of the force 805.

Figure 8B:
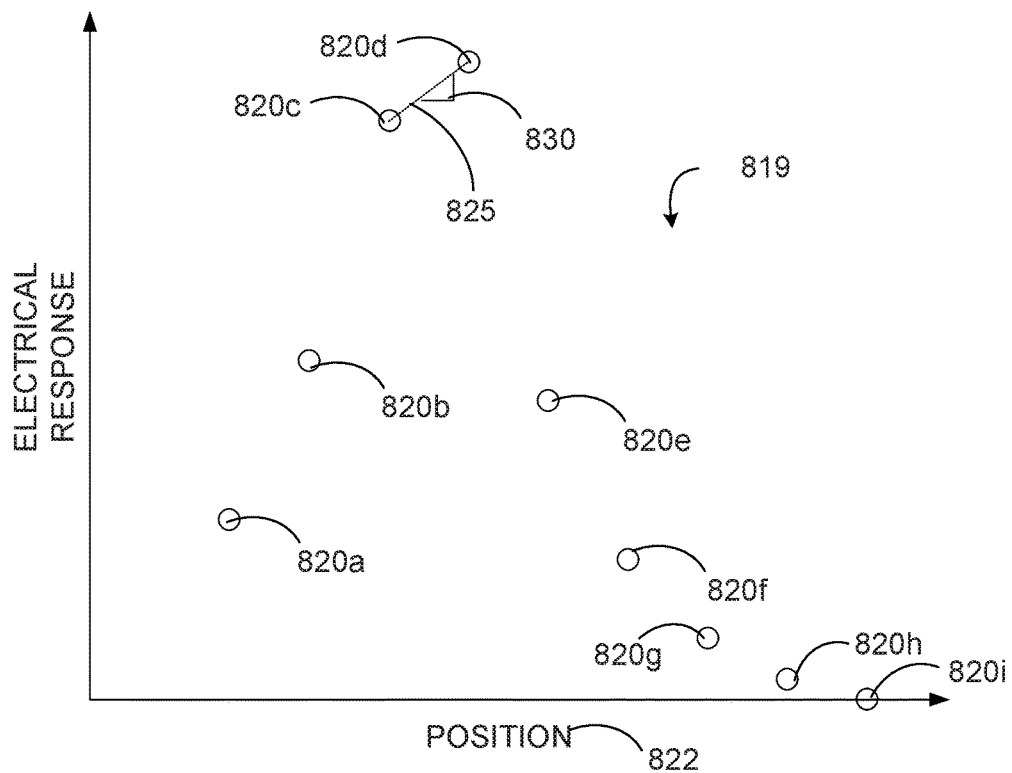
FIG. 8B is a graph of electrical responses generated from the contact between the mobile robot and the object of FIG. 8A.

In the example as shown in FIG. 8A, the capacitive sensors 210c and 210d located in the vicinity of the force 805 react more to the force 805 than do the other capacitive sensors 210a to 210b and 210e to 210i. A graph 819 of FIG. 8B shows electrical responses 820a to 820i—which can be represented as changes in, for example, voltages, current, or other appropriate electrical signal relative to a neutral baseline signal—of the capacitive sensors 210a to 210i, respectively. Each of the capacitive sensors 210a to 210i are located along the bumper 200 at a position 822, which is a linear one-dimensional position measured along the bumper 200. The electrical responses 820a to 820i can therefore be associated with the positions of the capacitive sensors 210a to 210i, respectively.

The electrical responses 820c and 820d are greater than other electrical responses 820a to 820b and 820e to 820i because the location of force 805 is in between the positions of the capacitive sensors 210c and 210d. Furthermore, the capacitive sensors 210c and 210d, by both being coupled to the same segment (e.g., the segment 206c) of the backing 204 (shown in FIG. 2), exhibit a greater response to the force 805 per unit force than the other capacitive sensors 210a to 210b and 210e to 210i exhibit. As described herein, the electrical responses 820c and 820d can exhibit greater changes in response to the force 805 because of flexible connecting elements 208b, 208c that separate the segment 206c from the other segments 206.

Based on the electrical responses 820a to 820i, the controller 705 can determine attributes of the force 805 resulting from the contact with the object 800. For example, the controller 705 can determine a location and a magnitude of the force 805. The controller 705 can determine that the general location of the force 805 is in the vicinity of the segment 206c because the electrical responses 820c and 820d from the capacitive sensors 210c and 210d are greater than the electrical responses 820a to 820b and 820e to 820i from the other capacitive sensors 210a to 210b and 210e to 210i, respectively. The controller 705 can perform an interpolation process based on the electrical responses 820c and 820d from the capacitive sensors 210c and 210d to identify a precise location of the force 805 along the segment 206c. The interpolation can be a linear interpolation. In some cases, the interpolation may account for non-linear variations in, for example, stiffness, elasticity, and geometry, along the segment 206c and can thus be a non-linear interpolation, such as a polynomial interpolation.

In one example, the controller 705 can compute a slope 830 of an interpolation line 825 between the electrical responses 820c and 820d to determine the location along the segment 206c to which the capacitive sensors 210c and 210d are attached. Generally, if the slope 830 is zero, the controller 705 can determine that the force 805 is at a point that is substantially equidistant from each of the capacitive sensors 210c and 210d. If the slope 830 is positive, the controller 705 can determine that the force 805 is closer to the capacitive sensor 210d. If the slope 830 is negative (as depicted in FIG. 8A), the controller 705 determines that the force 805 is closer to the capacitive sensor 210c. In particular, the controller 705 can compute a difference between the slope 830 and a predetermined reference slope stored on, for example, the memory storage element 710. The predetermined reference slope can define a relationship between a position of a force (e.g., a position of the force 805) along a segment (e.g., the segment 206c) relative to a capacitive sensor (e.g., the capacitive sensor 210c). Thus, the computed difference can indicate a location of the force 805 relative to the positions of each of the capacitive sensors 210c and 210d. The controller 705 can thus determine the location of the force 805 along the bumper 200. In some cases, the controller 705 can normalize the slope 803 to the average magnitude of the response s820c and 820d.

In another example, the controller 705 can determine a ratio of the electrical response 820c to the electrical response 820d to determine the location of the force 805 along the bumper 200. A ratio of unity can indicate the location of the force 805 is equal distance from the capacitive sensor 210c and the capacitive sensor 210d. A ratio greater than one can indicate that the location of the force 805 is closer to the capacitive sensor 210c, and a ratio less than one can indicate that the location of the force 805 is closer to the capacitive sensor 210d. The system can calculate the ratio of the electrical responses and, based at least partially on the ratio, determine the location of the contact.

Based on the electrical responses 820a to 820i, the controller 705 can also determine a magnitude of the force 805. For example, the controller 705 can compute an average of the electrical responses 820c and 820d. The controller 705 can then compute a difference between the average and a predetermined reference average stored on the memory storage element 710. The predetermined reference average defines a relationship between a force magnitude (e.g., the magnitude of the force 805) and an average of two electrical responses (e.g., the electrical responses 820a to 820i). Thus, the computed difference can indicate a magnitude of the force 805. The controller 705 can thus determine the magnitude of the force 805 on the bumper 200 from the computed difference.

In some additional examples, the magnitude of the force could be computed based summing the values of multiple sensors. The relative responses of multiple sensors could also be used to determine if a force is local to a small area or distributed over a large area, which occurs for soft obstacles. Thus, the system can determine that the contact is with a small object (e.g., a post, a chair leg, a table leg) when only one to two sensors exhibit a large response. However, if a larger number of sensors (e.g., 3 or more sensors) exhibit a large response the system can determine it has contacted a larger obstacle such as a well. Similarly, if a larger number of sensors exhibit a small response, the system may determine that the robot has contacted a soft or compliant surface.

Figure 9A:
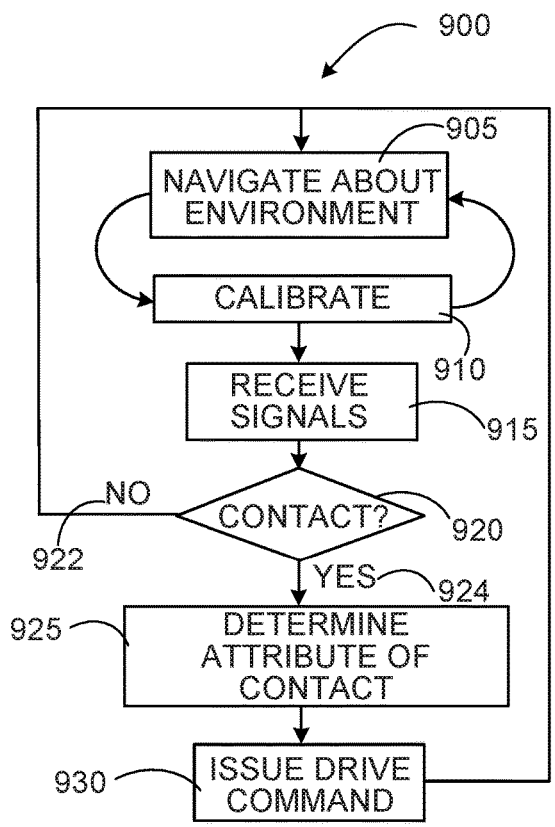
FIG. 9A is a flow chart showing a process implemented by a mobile robot to detect contact with an obstacle.

FIG. 9A shows a flow chart illustrating a process 900 of issuing one or more drive commands in response to detecting contact along a bumper (e.g., the bumper 200) of a robot (e.g., the robot 100).

According to process 902, the controller controls (905) the robot to navigate around an environment. The controller can issue navigation, drive, and behavioral commands to effect control. During navigation, the controller also calibrates (910) bumper sensors for the robot's bumper. The controller can intermittently (e.g., at a frequency of 0.01 Hz to 0.1 Hz, 0.1 Hz to 1 Hz, or 1 Hz to 10 Hz) and dynamically (e.g., while the robot navigates about the environment) calibrate the bumper sensors to a baseline signal. During the dynamic calibration, the bumper is uncompressed. Accordingly, electrical signals received by the controller act as the baseline signal against which other electrical signals are compared. In some implementations, the controller can implement a low-pass filtering routine such that the controller to filter out signals above a threshold frequency. The controller can thus set baseline signal as samples below the threshold frequency of the low-pass filtering routine, which can be between, e.g., 0.01 Hz to 0.1 Hz, 0.1 Hz, or 1 Hz to 10 Hz. In some examples, the frequency could be adjusted based on the speed of the robot to filter out noise at frequencies that are not expected for contact signals.

In response to force applied against the bumper, the bumper sensors generate electrical signals that differ from the calibrated electrical signals, and the controller receives (915) the electrical signals. The electrical signals can be, for example, analog signals (e.g., a voltage, current, or other appropriate electric signal). The analog signals can respond to a parameter that continuously varies within a range, such as, for example, capacitance, inductance, magnetic field, distance, displacement, or other appropriate continuous parameter. The electrical signals can be directly proportional or inversely proportional to an amount of displacement of the bumper or an amount of force on the bumper. In some examples, the electrical signals may be related to the amount of displacement of the bumper through a non-linear smooth function, such as a polynomial, a spline, an exponential, etc. The electrical signals can thus vary continuously as the amount of displacement varies.

After the controller receives (915) the electrical signals, the controller determines (920) whether the bumper of the robot has, for example, made contact with an object of the environment. The controller can do this by determining (922) that the electrical signals do not exceed a threshold difference from the calibrated electrical signals. In such a case, the controller instructs the robot to continue navigating about environment at the operation 905.

If the electrical signals do exceed the threshold difference, the controller can determine (924) that the bumper has made contact. The controller then determines (925) an attribute of the contact, examples of which are described herein with respect to FIGS. 9B and 9C. For example, the controller can determine a location of the contact along the bumper, a magnitude of a force caused by the contact, or a duration of the contact.

The controller issues (930) a command to the robot based on the determined attributes. For example, the controller, upon determining the location of the contact, can issue a navigational command that instructs the robot to turn around the location of the contact. In some cases, the controller may instruct the robot to follow the object with which the robot has made contact. For example, the object may be a wall, and the controller may instruct the robot to execute a wall following behavior where the robot moves along the wall. The controller may instruct the robot to maintain a magnitude of the force within a predetermined force range while the robot executes the wall following behavior. After the controller has issued commands in response to the contact, the robot continues navigating around the environment.

Figure 9B:
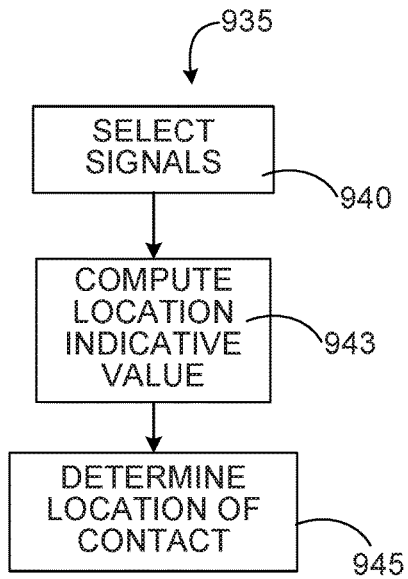
FIG. 9B is a flow chart showing a process to determine a location of the contact described in FIG. 9A.

When the controller determines (925) the attribute of the contact, the controller can execute different processes to determine different attributes of the contact. The controller can implement several of these processes to utilize the variation of the electrical signals over a continuous range to determine (925) the attribute of the contact. FIG. 9B shows an example flow chart illustrating a process 935 in which the controller determines a location of the contact based on the received (915) electrical signals.

According to process 937, the controller select (940) two electrical signals received (915) from two bumper sensors. The controller can select (940) the two electrical signals based on strengths of the two electrical signals. For example, the controller can select (940) the two electrical signals with the two greatest strengths, which can indicate that the two bumper sensors that generated those two electrical signals are in closer proximity to the location of the contact.

After the controller selects (940) the two electrical signals, the controller computes (943) a location indicative value based at least on the two electrical signals. The location indicative value can be, for example, a difference between the two electrical signals. The controller can associate the two electrical signals with locations of the bumper sensors that generated the two electrical signals. The locations of the bumper sensors can be measured as positions of the bumper sensors along the bumper. The electrical signal and the location of the bumper sensor thus can form an ordered pair. The controller can compute (943) the location indicative value to be a slope based on the two electrical signals and the two locations along the bumper of the two bumper sensors that generated the two electrical signals. In such a case, the controller can perform a linear interpolation between the two ordered pairs for the two electrical signals.

The controller then determines (945) the location of contact based on the location indicative value. The controller can compare the location indicative value to a reference value. Based on a difference between the location indicative value and the reference value, the controller can determine the location of contact. For example, if the location indicative value is the difference between the two electrical signals, the controller can compare the difference to a reference difference. The reference difference can be an estimated difference between the two electrical signals that would be expected for contact at a certain location along the bumper. In another example, the controller can perform an interpolation. If the location indicative value is the slope, the controller can perform an interpolation and compare the slope from the interpolation to a reference slope. The reference slope can be an estimated slope between the two electrical signals that would be expected for contact at a certain location along the bumper.

In some implementations, the controller may select (940) three or more electrical signals from three or more bumper sensors. For example, the controller may perform an interpolation based on the readings of all sensors for which the electrical signals exceed a threshold reading. The interpolation can thus be a polynomial interpolation or other interpolation of a data set.

Figure 9C:
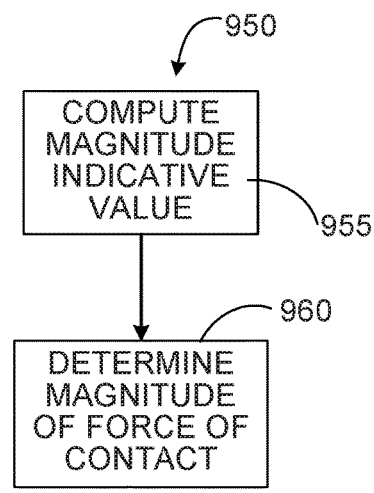
FIG. 9C is a flow chart showing a process to determine a magnitude of the contact described in FIG. 9B.

FIG. 9C shows another example flow chart illustrating a process 950 in which the controller determines a magnitude of a force of the contact based on the received (915) electrical signals.

According to the process 952, the controller computes (955) a magnitude indicative value based on the received (915) electrical signals. The magnitude indicative value can be, for example, an average of the electrical signals, an average of a subset of the electrical signals, the maximum electrical signal, or the sum of the electrical signals from among the received (915) electrical signals.

The controller determines (960) the magnitude of the force of the contact based on the magnitude indicative value. The controller compares the magnitude indicative value to a reference value. For example, if the magnitude indicative value is the average of the received (915) electrical signals, the reference value can be a predetermined average that would be expected for a known magnitude of the force of contact. In some cases, the controller executes the process 952 after the controller determines (945) the location of contact. The reference value can thus be a predetermined value that would be expected for a known magnitude of the force of contact at a known location. In such a case, the magnitude indicative value may a single electrical signal, such as the maximum electrical signal. The controller can interpret a greater difference between the magnitude indicative value and the reference value to indicate a greater magnitude of the force.

Figure 10:
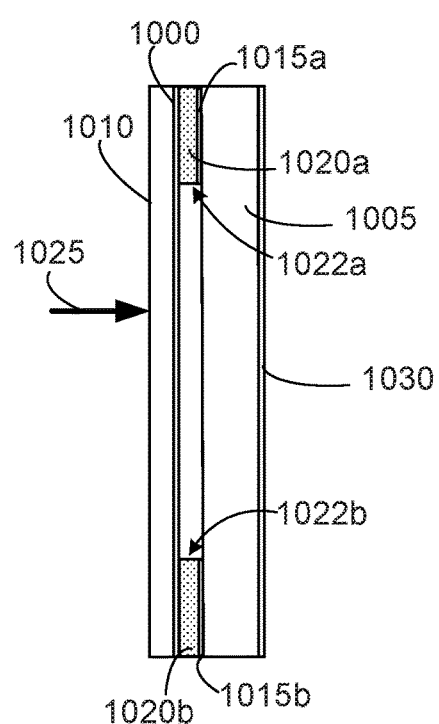
FIGS. 10 to 12 are side cross-sectional views of alternative capacitive sensors.
Figure 11:
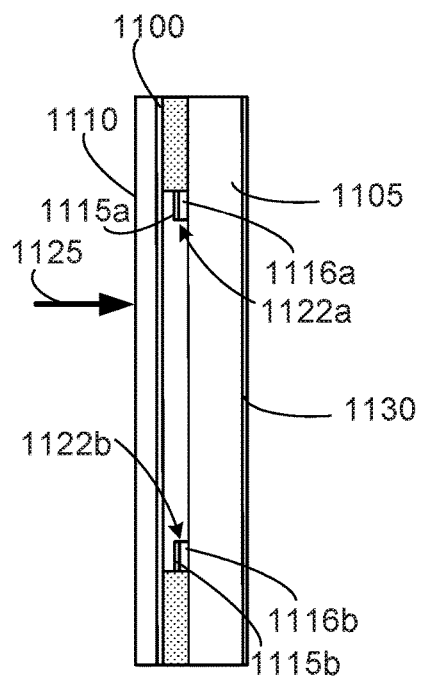
Figure 12:
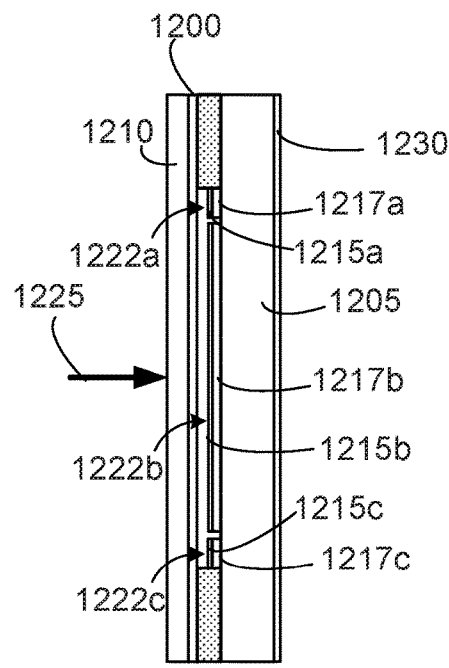

Additional and alternative implementations of the robots, sensors, and methods described are also provided. For example, a structure of the capacitive sensors described herein can vary. In the example of FIG. 5, the movable plate 214 is adjacent to a side of the body 109 facing away from the backing 204, and the stationary plate 216 is attached to the side of the body 109 facing away from the backing 204. FIGS. 10 to 12 show alternative implementations. In these alternative implementations, movable plates are attached to the side of the backing facing the body, and stationary plates are attached to the side of the body facing the backing. These implementations also differ in how capacitance varies with movement of the backing relative to the body. For example, in the implementations of FIGS. 10 to 12, compression between the backing and the body causes the plates to move closer together, whereas in the implementation of FIG. 5, compression between the backing and body causes the plates to move apart or farther apart.

The geometries of the movable plates and the stationary plates result in capacitors. The movable plate can be circular, rectangular, or some other shape that complements the shape of the stationary plate. The stationary plate can be circular, rectangular, or some other shape that complements the portion of the body to which the stationary plate is mounted. The movable plates can each have an area between, for example, 100 square millimeters and 1000 square millimeters or 1000 square millimeters and 2000 square millimeters. The stationary plates can have an area between, for example, 100 square millimeters and 1000 square millimeters or 1000 square millimeters and 2000 square millimeters.

Referring to FIG. 10, the movable plate 1000 attached to the backing 1010 faces the robot body 1005, and stationary plates 1015a, 1015b on the robot body 1005 face the backing 1010. Dielectrics 1020a, 1020b separate the stationary plates 1015a, 1015b from the movable plate 1000. The dielectrics 1020a, 1020b can be a deformable material, such as foam. Each stationary plate 1015a, 1015b, each dielectric 1020a, 1020b, and the movable plate 1000 form a capacitive sensor 1022a, 1022b. To shield the stationary plate 1015a, 1015b from electrical fields generated by other sources besides the movable plate 1000, a grounded metal plate 1030 can cover a side of each of the stationary plates 1015a, 1015b opposite of the movable plate 1000. The force 1025 on the backing 1010 causes displacement of the movable plate 1000 relative to the stationary plates 1015a, 1015b. A location of the force 1025 along the backing 1010 may affect the reactivity of each of the capacitive sensors 1022a, 1022b to the force 1025. For example, the force 1025 on the backing 1010 is closer to the capacitive sensor 1022a than it is to the capacitive sensor 1022b. Thus, the capacitive sensor 1022a reacts more to the force 1025. In a case where the force 1025 is equidistant from the capacitive sensor 1022a, 1022b, the sensors 1022a, 1022b are equally reactive to the magnitude of the force 1025 and are equally activated for a given magnitude. In any event, the controller may determine, based on a measurement of the force, where along the backing 1010 the force occurred.

Referring to FIG. 11, the movable plate 1100 attached to the backing 1110 faces the robot body 1105, and stationary plates 1115a, 1115b situated on spacers 1116a, 1116b attached to the robot body 1105 face the backing 1110. Air can separate the movable plate 1100 from the stationary plates 1115a, 1115b and thus serves as a dielectric for capacitive sensors 1122a, 1122b. A grounded metal plate 1130 shields a side of each of the stationary plates 1115a, 1115b opposite of the movable plate 1100. The heights of the spacers 1116a, 1116b decrease the distance between the movable plate 1100 and the stationary plates 1115a, 1115b such that smaller changes in the distance result in larger changes in capacitance of the sensors 1122a, 1122b. As a result, the spacers 1116a, 1116b allow each of the capacitive sensors 1122a, 1122b to react more to a force 1125 on the backing 1110.

Referring to FIG. 12, the movable plate 1200 attached to backing 1210 faces the robot body 1205, and stationary plates 1215a, 1215b, 1215c situated on spacers 1217a, 1217b, 1217c attached to the robot body 1205 face the backing 1210. A grounded metal plate 1230 shields a side of each of the stationary plates 1215a, 1215b, and 1215c opposite of the movable plate 1100. The movable plate 1200 can be capacitively coupled to the stationary plate 1215b, which can be grounded using electrical wires connected to ground. As a result, in such implementations, the movable plate 1200 can be floating so that the movable plate 1200 does not need to be connected to wires that also move as the movable plate 1200 moves. As described herein, the spacers 1217a, 1217b, 1217c make capacitive sensors 1222a, 1222b, 1222c more reactive to a force 1225 on the backing 1210.

Figure 13:
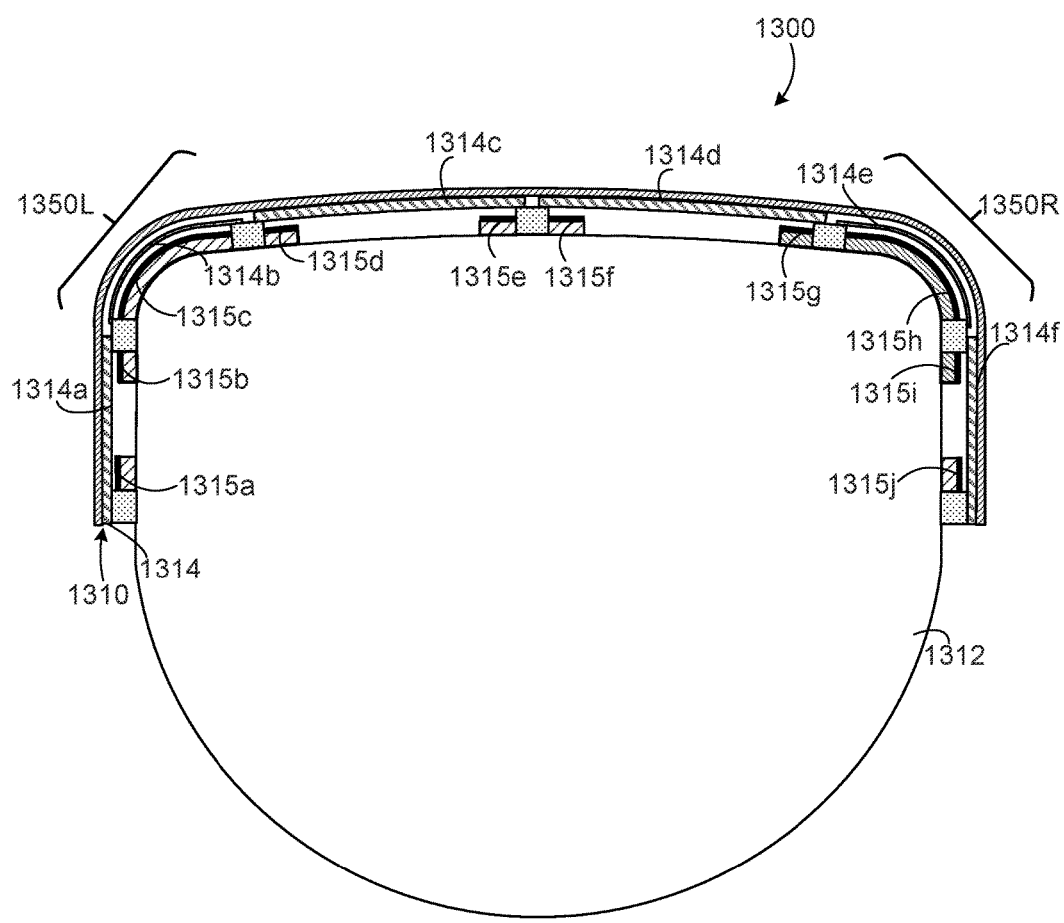
FIGS. 13 and 14 are top views of mobile robots including alternative bumpers with capacitive sensors.
Figure 14:
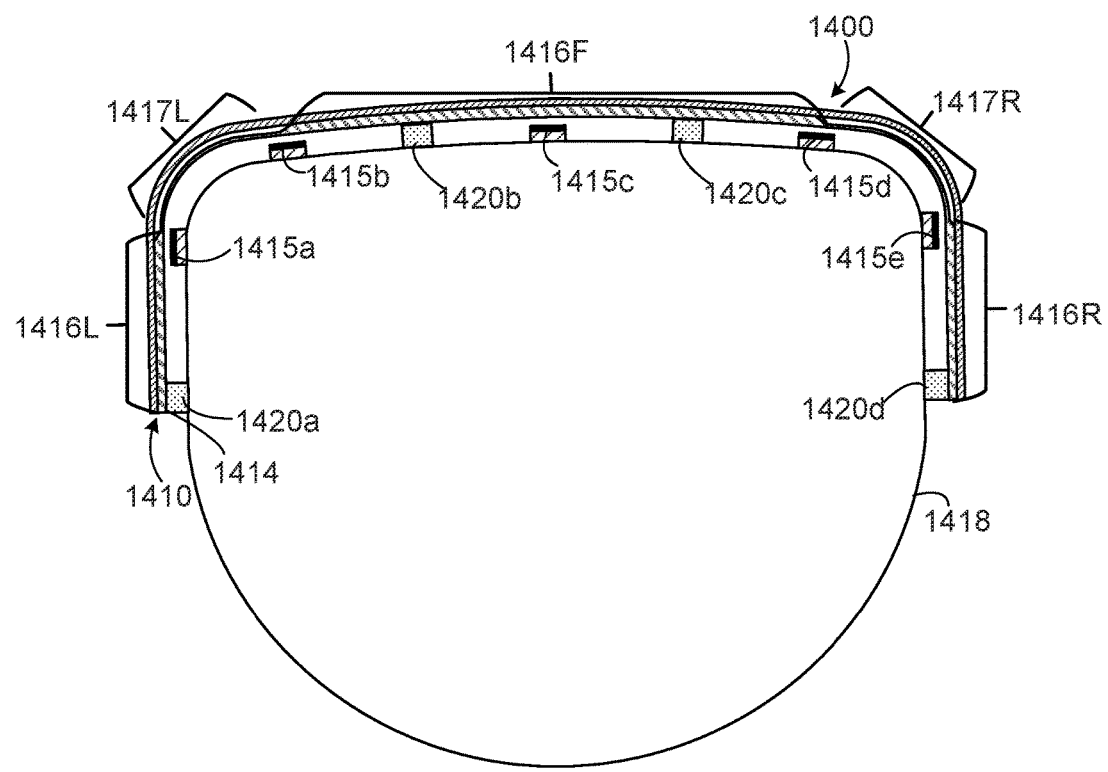

FIGS. 13 and 14 depict alternative bumpers having capacitive sensors that vary in location and backings that vary in structure. In one implementation, a robot 1300 shown in FIG. 13 that can detect forces along a bumper 1310 mounted on a body 1312 using capacitive sensors 1315a to 1315j (collectively referred to as capacitive sensors 1315), which are of the capacitive sensor types described with respect to FIGS. 10 to 12.

In contrast to the segments 206 shown in FIG. 2 that are continuously connected to one another via connecting elements 208, the bumper 1310 includes discontinuous backing segments 1314a to 1314f (collectively referred to as backing segments 1314). As a result, a force on one backing segment 1314 does not typically transfer to other backing segments 1314. The capacitive sensors 1315 can include a movable plate coupled to the backing segments 1314 and a stationary plate coupled to a body 1312 of the robot 1400. In an example, a force on the segment 1314a causes the electrical signals generated by the capacitive sensors 1315a and 1315b to change more than electrical signals generated by the capacitive sensors 1315c to 1315j. As a result, the capacitive sensors 1315 react more to forces that are on the segments 1314 to which they are attached than to forces that are on the segments 1314 to which they are not attached.

Referring to FIG. 13, the capacitive sensor 1315c and 1315h are located on a left corner 1350L and a right corner 1350R of the bumper 1310, respectively. The capacitive sensors 1315c and 1315h thus can include non-planar stationary plates and non-planar movable plates that conform to the curved shapes of the corners 1350L, 1350R. Capacitive sensors 1315c and 1315h react more than the capacitive sensors 1315a to 1315b, 1315d to 1315f, and 1315h to 1315j to forces on the corners 1350L, 1350R of the bumper 1310. Furthermore the segment 1314b on the left corner 1350L and the segment 1314e at the right corner 1350R may be thinner to increase their flexibility and thus their reaction to forces on the corners 1350L, 1350R.

In another implementation shown in FIG. 14, bumper 1410 of robot 1400 includes a backing 1414 that includes continuous segments 1416F, 1416R, 1416L, 1417L, 1417R with varying thicknesses to achieve varying rigidities. The backing 1414 can be formed of a rigid material, such as polycarbonate, sheet metal, or some other stiff material. The robot 1400 includes capacitive sensors 1415a to 1415e (collectively referred to as capacitive sensors 1415) of the types described with respect to FIGS. 10 to 12. The capacitive sensors 1415 thus can include a movable plate (e.g., the movable plate 1000, 1100, 1200 of FIGS. 10 to 12, respectively) coupled to the backing 1414 and a stationary plate (e.g., the stationary plate 1015, 1115, 1215 of FIGS. 10 to 12, respectively) coupled to a body 1418 of the robot 1400.

Front segment 1416F, right segment 1416R, and left segment 1416L of the backing 1414 can have a greater stiffness than left corner segment 1417L and right corner segment 1417R of the backing 1414 to reduce the amount of force transferred between the segments 1416F, 1416R, 1416L. The backing 1414, which includes movable plates of the capacitive sensors 1415a to 1415e, can be separated from the robot body 1418, which includes stationary plates of the capacitive sensors 1415, by supports 1420a to 1420d (collectively referred to as supports 1420). Thus, as the backing 1414 deforms, the movable and stationary plates move relative to one another. The supports 1420 further serve as reference locations and/or boundary conditions when a controller (e.g., the controller 705) of the robot 1400 implements an interpolation routine on electrical signals generated by the capacitive sensors 1415a to 1415e.

Figure 15:
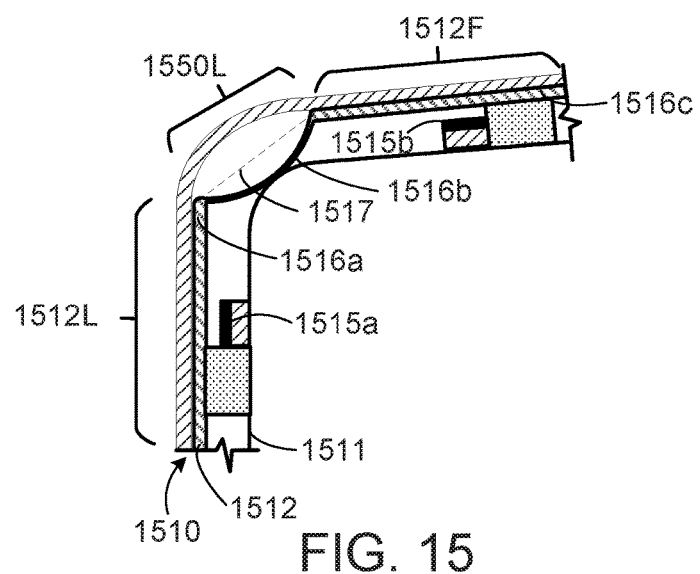
FIGS. 15 and 16 are enlarged views of corners of alternative bumpers with capacitive sensors.
Figure 16:
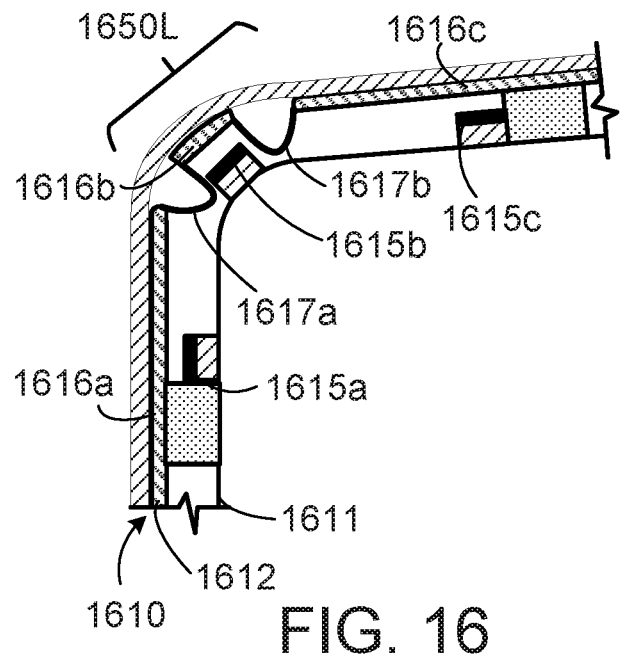

In some implementations, geometries of the backing can affect the reaction of the capacitive sensors to forces at specific locations along the bumper. FIGS. 15 to 16 show alternative implementations of different geometries of a backing of a bumper along corners of the bumper. Structure of the backing in the corners can determine an amount of force that transfers from a lateral side to a forward side of the backing. The structure of the backing at the corner can be designed to reduce the amount of forced transfer between sides.

A bumper can include backing that has a corner geometry that mitigates transfer of forces between a front side and a lateral side. The backing can include elements that elongate, thin, or incorporate other features into the corner geometry such that the corner geometry is more flexible than adjacent geometry on the front side and the lateral side. The backing thus can mechanically decouple the front side and the lateral side of the bumper by significantly reducing transfer of forces between the front side and the lateral side. A force applied on a segment has a reduced influence on adjacent segments, allowing the location of the applied force to be determined more easily.

FIG. 15 shows a top view of a robot magnified on a left corner 1550L of a bumper 1510 of the robot that includes features to reduce the transfer of forces between a forward side 1512F of a backing 1512 and a lateral side 1512 of the backing 1512. The bumper 1510 is mounted onto a robot body 1511. At the corner 1550L, the backing 1512 of the bumper 1510 includes segments 1516a, 1516b, and 1516c that are connected to one another in series. The connecting segment 1516b serves as a connecting element that connects the lateral segment 1516a of the lateral side 1512L of the backing 1512 and the forward segment 1516c of a forward side 1512F of the backing 1512. A capacitive sensor 1515a includes a movable plate (e.g., the movable plate 1000, 1100, 1200 of FIGS. 10 to 12, respectively) attached to the lateral segment 1516a and a stationary plate (e.g., the stationary plate 1015, 1115, 1215 of FIGS. 10 to 12) attached to the robot body 1511. A capacitive sensor 1515b includes a movable plate (e.g., the movable plate 1000, 1100, 1200 of FIGS. 10 to 12, respectively) attached to the forward segment 1516c and a stationary plate (e.g., the stationary plate 1015, 1115, 1215 of FIGS. 10 to 12) attached to the robot body 1511.

The geometry of the connecting segment 1516b allows the connecting segment 1516b to serve as a flexure that absorbs the force from adjacent segments. In particular, the connecting segment 1516b can reduce the amount of force transferred from the forward side 1512F to the lateral side 1512L or from the lateral side 1512L to the forward side 1512F. As depicted in FIG. 15, to extend the length of the connecting segment 1516c, the connecting segment 1516b is curved (e.g., concave or convex) relative to a path 1517 between the forward side 1512F and the lateral side 1512L. The connecting segment 1516b has a length that is greater than a length of the path 1517 and is angled away from both the forward segment 1516c and the lateral segment 1516a. In some cases, the connecting segment 1516b has a length that is 1.1 times to 1.5 times, 1.5 times to 3 times, 3 times to 4.5 times the length of the path 1517.

The connecting segment 1516b is shown to have a concave geometry, although in other cases, the connecting segment 1516b can be convex, triangular, jagged, or have other geometry that increases a length of the connecting segment 1516b. In other implementations, the connecting segment 1516b can include multiple curves or splines that increase the length of the connecting segment 1516b relative to the length of the path 1517.

In some cases, the bumper may include a bumper sensor associated with the corner, and the geometry of the backing at the corner can be designed to mitigate force transfer between the corner and the sides of the backing and between the sides of backing. For example, the corner segments can be elongated, split, or thinned to make the backer more flexible near the corners so that its segments could move somewhat independently from each other in response to the applied force. Without this special treatment of the corners, in some examples, the backer near the corners can be somewhat rigid and its segments are difficult to move. As a result of such mechanical decoupling, the influence of each segment on the sensors associated with adjacent segments is reduced, which makes it easier to determine the location of the applied force. FIG. 16 illustrates an example of this mitigation of force transfer. FIG. 16 shows a top view of a robot magnified on a left corner 1650L of a bumper 1610 of the robot. The bumper 1610 is mounted onto a robot body 1611. At the corner 1650L, a backing 1612 of the bumper 1610 includes backing segments 1616a, 1616b, and 1616c that are connected to one another in series via connecting elements 1617a, 1617b. The connecting element 1617a connects the lateral segment 1616a and the corner segment 1616b. The connecting element 1617b connects the corner segment 1616b to the forward segment 1616c. Capacitive sensor 1615a, 1615b, 1615c include movable plates (e.g., the movable plate 1000, 1100, 1200 of FIGS. 10 to 12, respectively) attached to the lateral segment 1616a, the corner segment 1616b, and the forward segment 1616c, respectively, and stationary plates (e.g., the stationary plate 1015, 1115, 1215 of FIGS. 10 to 12) attached to the robot body 1611.

The connecting elements 1617a, 1617b lengthen the connection between segments 1616 and reduces force transfer between the segments 1616a, 1616b, 1616c. The connecting element 1617a has a curvature that causes the length of the connecting element 1617a to be greater than a length of a straight-line connection between the lateral segment 1616a and the corner segment 1616b. Similarly, the connecting element 1617b has a curvature that causes the length of the connecting element 1617*b* to be greater than a length of a straight-line connecting between the corner segment 1616*b* and the forward segment 1616*c*. For example, the connecting elements 1617*a* are angled away from both the forward segment 1616*c* and the lateral segment 1616*a*. Thus, the connecting element 1617*a* reduces the amount of force transferred between the lateral segment 1616*a* and the corner segment 1616*b*. The connecting element 1617*b* reduces the amount of force transferred between the forward segment 1616*c* and the corner segment 1616*b*. The connecting elements 1617*a*, 1617*b* isolate forces to within each of the lateral segment 1616*a*, the corner segment 1616*b*, and the forward segment 1616*c*. The connecting elements 1617*a*, 1617*b* thus allow each of the capacitive sensors 1615*a*, 1615*b*, 1615*c* to more accurately detect forces on the segment 1616*a*, 1616*b*, 1616*c* to which their movable plate is attached.

While the connecting elements 1617*a*, 1617*b* are shown as concave to accomplish this purpose, in some implementations, the connecting elements 1617*a*, 1617*a* are convex. In other implementations, the connecting elements 1617*a*, 1617*b* can include multiple curves or splines that lengthen the connecting elements 1617*a*, 1617*b*.

Figure 17:
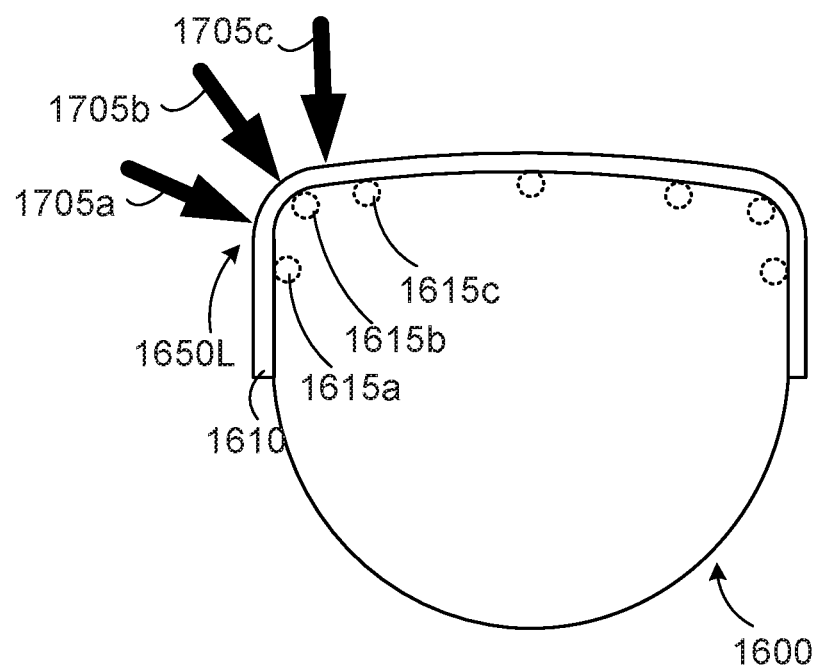
FIG. 17 is a top view of a mobile robot contacting an object.

FIG. 17 show potential locations of a lateral force 1705*a*, a corner force 1705*b*, and a front force 1705*c* on the left corner 1650L on the bumper 1610 of the robot 1600 due to, for example, contact with an object near the left corner 1650L of the bumper 1610. In the event that the lateral force 1705*a* is applied to the bumper 1610, the capacitive sensor 1615*a* responds with a greater electrical response than either of the capacitive sensors 1615*b*, 1615*c*. In the event that the corner force 1705*b* is applied to the bumper 1610, the capacitive sensor 1615*b* responds with a greater electrical response than either of the capacitive sensors 1615*a*, 1615*c*. In the event that the forward force 1705*c* is applied to the bumper 1610, the capacitive sensor 1615*c* responds with a greater electrical response than either of the capacitive sensors 1615*a*, 1615*b*. Due to the length, curvature, and other geometric aspects of the connecting elements 1617*a*, 1617*b*, as shown with respect to FIG. 16, the forces 1705*a*, 1705*b*, 1705*c* do not easily transfer between segments 1616*a*, 1616*b*, 1616*c*.

While the movable plate has been described to move relative to the stationary plate in response to a horizontal force that pushes the movable plate inward, in some implementations, the movable plate can include features that allow a force having a non-horizontal component to cause movement of the movable plate relative to the stationary plate. In the example of FIG. 5, the post 212 coupled to the movable plate 214 extends toward the body 109 and through the hole 213 of the robot body 109 to control movement of the movable plate relative to the stationary plate. FIGS. 18 to 21 show alternative implementations of movable plates that allow a force having a non-horizontal component to cause movement of the movable plate relative to the stationary plate.

Figure 18:
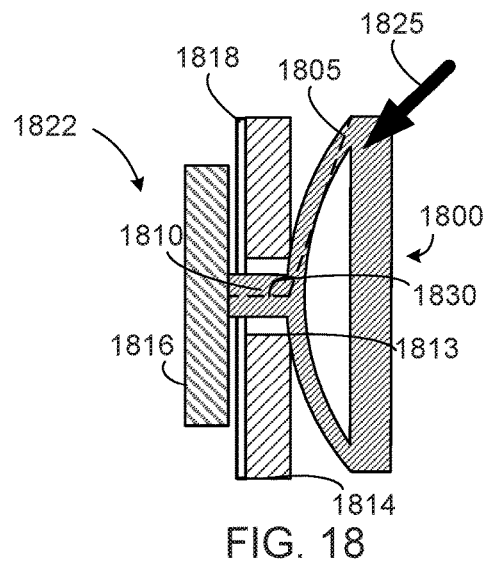
FIG. 18 is a side view of an alternative capacitive sensor.
Figure 19:
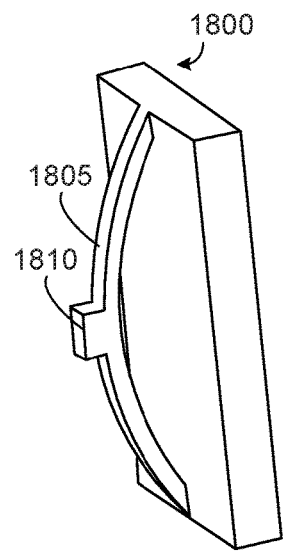
FIG. 19 is a perspective view of the capacitive sensor of FIG. 18.

A linkage incorporated into the structure of the movable plate can allow forces that have a non-horizontal component to cause horizontal movement of the movable plate relative to the stationary plate. As shown in FIGS. 18 and 19, which show portions of a backing 1800, the backing 1800 of a bumper (e.g., the bumper 200) can include a linkage 1805 connected to a post 1810. The post 1810 traverses a hole 1813 of a robot body 1814 and attaches to a movable plate 1816 of a capacitance sensor 1822. A stationary plate 1818 attached to the robot body 1814 faces the movable plate 1816. A force 1825, which includes a horizontal component and a vertical component, exerted on the backing 1800 can transfer through the linkage 1805 to the post 1810, thus causing horizontal displacement of the movable plate 1816. The linkage 1805 thus serves as a spring that transfers vertical and horizontal forces to the movable plate 1816.

The geometry of the linkage 1805 can facilitate the transfer of force through the backing 1800 to the movable plate 1816. The linkage 1805 can form an angle 1830 with the post 1810 such that forces (e.g., the force 1825) that form a similar angle as the angle 1830 easily transfer through the linkage 1805 to the post 1810. The angle 1830 can be between 100 degrees to 120 degrees, 120 degrees to 140 degrees, 140 degrees to 160 degrees. The linkage 1805 can follow a concave, convex, linear, or other path to connect the backing 1800 to the post 1810. In some cases, the linkage 1805 connects to an end of the backing 1800, and in other cases, the linkage 1805 may connect to a point between the end and the middle of the backing 1800.

Figure 20:
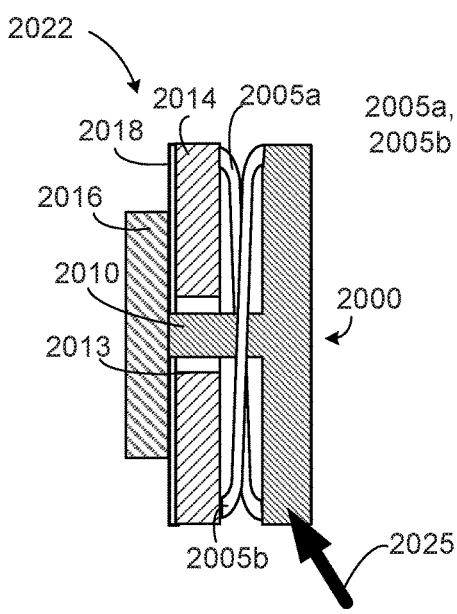
FIG. 20 is a side view of an alternative capacitive sensor.
Figure 21:
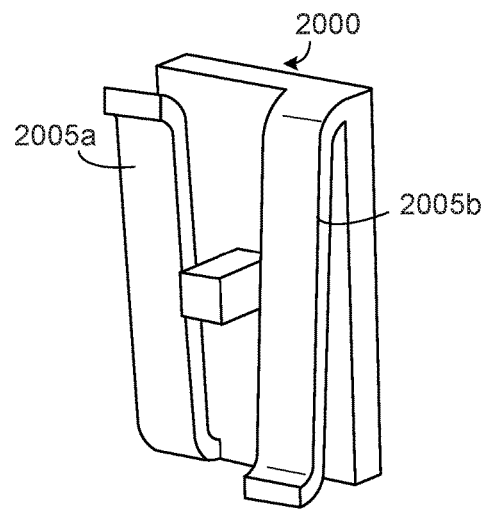
FIG. 21 is a perspective view of the capacitive sensor of FIG. 20.

Flexures can be incorporated into the structure of the backing so that the backing favors horizontal motion and disfavors non-horizontal motion. Referring to FIGS. 20 and 21, a backing 2000 of a bumper (e.g., the bumper 200) can include a flexure 2005*a* and a flexure 2005*b*. The backing 2000 also includes a post 2010 that traverses a hole 2013 of a robot body 2014 and attaches to a movable plate 2016 of a capacitive sensor 2022. A stationary plate 2018 attached to the robot body 2014 faces the movable plate 2016. The flexures 2005*a*, 2005*b* are engaged with the robot body 2014 such that a force 2025 on the backing 2000 that includes a non-horizontal component causes the flexure 2005*a*, 2005*b* to resist the non-horizontal force and thus reduce non-horizontal displacement of the movable plate 2016.

Figure 22:
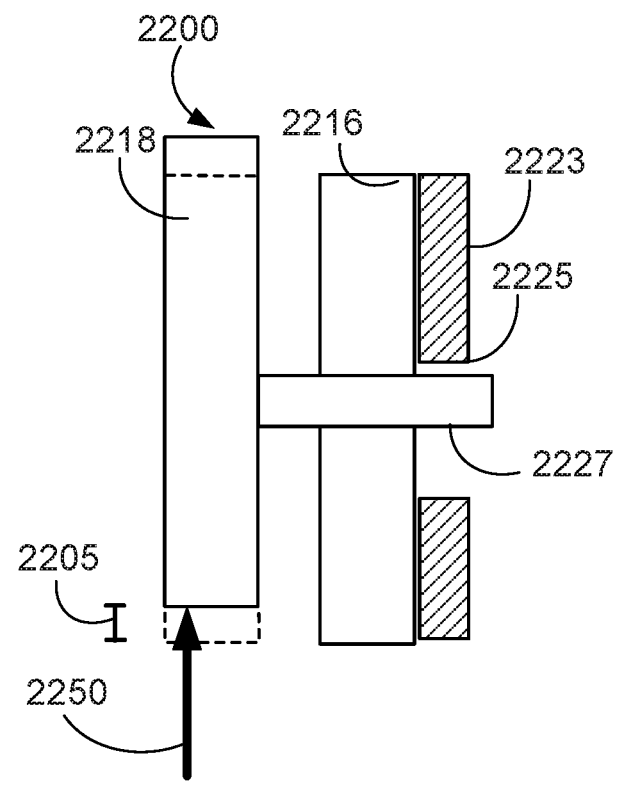
FIG. 22 is a side view of a capacitive sensor.
Figure 23:
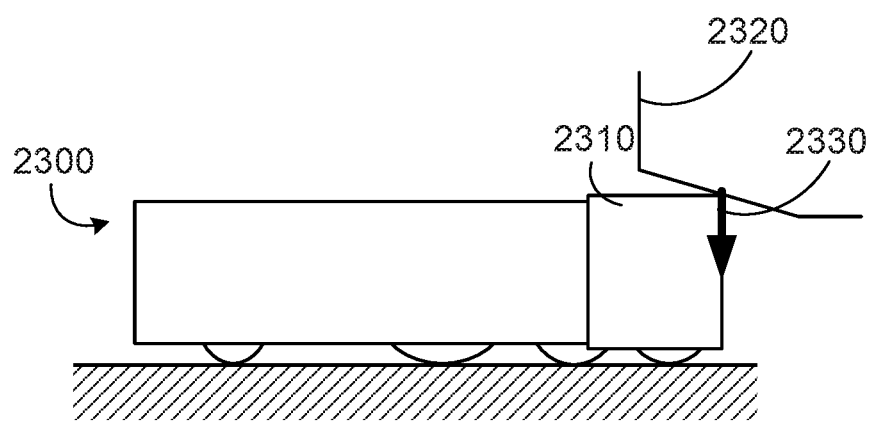
FIG. 23 is a side view of a mobile robot contacting an object.

In some cases, a capacitive sensor can allow lateral or sliding motion of a stationary plate relative to a movable plate and generate varying electrical signals due to the lateral motion. FIG. 22 shows a capacitive sensor 2200 that can generate an electrical signal in response to lateral motion of a movable plate 2218 of the capacitive sensor 2200 relative to a stationary plate 2216 of the capacitive sensor 2200. A hole 2225 of a body 2223 of a robot (e.g., a robot 2300 of FIG. 23) allows a post 2227 attached to the movable plate 2218 to move within the hole 2225. The movable plate 2218 can thus slide relative to the stationary plate 2216, which can cause a change in the capacitance of the capacitive sensor 2200 and thus a change in the electrical signal generated by the capacitive sensor 2200. The capacitance can vary based on a vertical distance 2205 between the movable plate 2218 and the stationary plate 2216. A vertical displacement 2250 can increase the vertical distance 2205, which effectively decreases the capacitive area of the capacitive sensor 2200. As a result, as the vertical distance 2205 increases, the capacitance of the capacitive sensor 2200 decreases. As the vertical distance 2205 decreases, the capacitance of the capacitive sensor 2200 increases. The electrical signal indicative of the capacitance can therefore be proportional to the vertical displacement 2250. In one example, the electrical signal of the capacitance can be inversely proportional to the vertical displacement 2250.

The capacitive sensor 2200 can thus generate an electrical response indicative of the vertical displacement 2250, and a controller can determine that the robot 2300 has contacted an object in the environment. The lateral motion shown in FIG. 22 includes the vertical displacement 2250 that is generally perpendicular to the floor surface about which a robot 2300, shown in FIG. 23, navigates. The vertical displacement 2250 can be caused by, for example, a bumper 2310 of the robot contacting an overhead object 2320. FIG.

23 shows a side schematic view of the robot 2300 contacting the overhead object 2320. When the bumper 2310 of the robot 2300 contacts the object 2320, a vertical force 2330 is applied to the bumper 2310. The vertical force 2330 causes a vertical displacement, and as described herein with respect to FIG. 22, the vertical displacement 2250 can cause the capacitive sensors (e.g., the capacitive sensor 2200) of the bumper 2310 to generate electrical signals that indicate that the bumper 2310 is experiencing the force 2330. In some cases, the electrical signals from the capacitive sensors may indicate that the force 2330 is a vertical force.

In some cases, the direction of a horizontal force on the robot (e.g., the robot 2300) includes a lateral component that can cause a sliding motion of the capacitive sensors (e.g., the capacitive sensor 2200) that results in a sliding displacement of the movable plate and the stationary plate relative to one another. The movable plate (e.g., the movable plate 2218) and stationary plate (e.g., the stationary plate 2216) can be displaced such that the lateral component changes the effective capacitive area of the capacitive sensor, similar to the displacement caused by the vertical displacement 2250 depicted in FIG. 23. As a result, as the lateral component increases in magnitude, the capacitive area decreases and the capacitance decreases. As the lateral component decreases in magnitude, the capacitive area increases and the capacitance increases. The sliding motion can cause a similar difference in the electrical signals from two or more capacitive sensors, and thus a controller (e.g., the controller 705) can determine that the force includes the lateral component.

Figure 24:
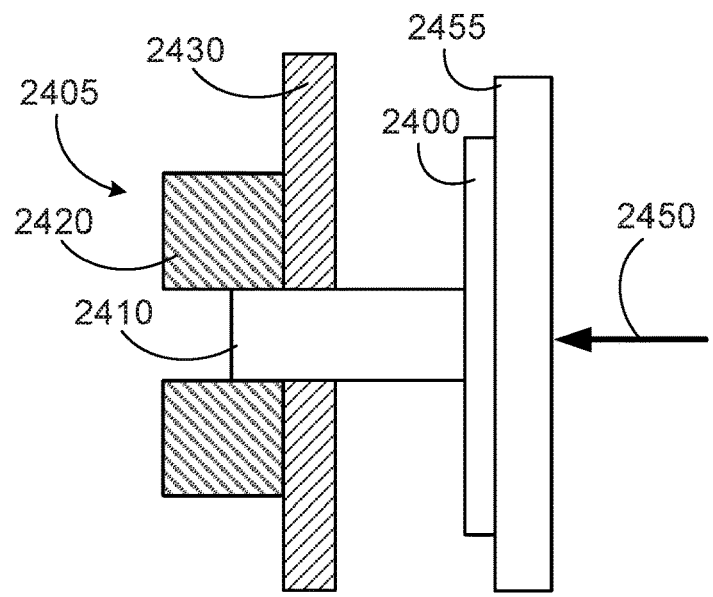
FIG. 24 is a side view of an inductive sensor for a bumper.

While the contact sensors described herein with respect to FIGS. 1 to 23 may be capacitive sensors, in other implementations, other electrical sensors that generate electrical signals in response to movement of the bumper relative to the body of the robot can be used. For example, referring to FIG. 24, a backing 2400 of a bumper (e.g., the bumper 200) can include an inductive sensor 2405. The inductive sensor includes a core 2410 attached to the backing 2400 and a winding 2420 attached to a robot body 2430. The core 2410 and the winding 2420 form an inductor, and the inductive sensor 2405 generates an electrical signal based on an inductance of the inductor. A force 2450 on a skin 2455 of the bumper transfers to the backing 2400, causing the backing 2400 to move relative to the body. The core 2410 thus passes through the winding 2420 as the backing 2400 moves. The inductance of the inductor increases as more of the core 2410 advances through the winding 2420. Thus, the electrical signal from the inductive sensor 2405 varies proportionally to an amount of displacement of the core 2410 relative to the winding 2420. In some cases, the core 2410 can be attached to the robot body 2430, and the winding 2420 can be attached to the backing 2400. In these cases, the electrical signal from the inductive sensor 2405 would likewise vary proportionally to an amount of displacement of the core 2410 relative to the winding 2420.

Figure 25:
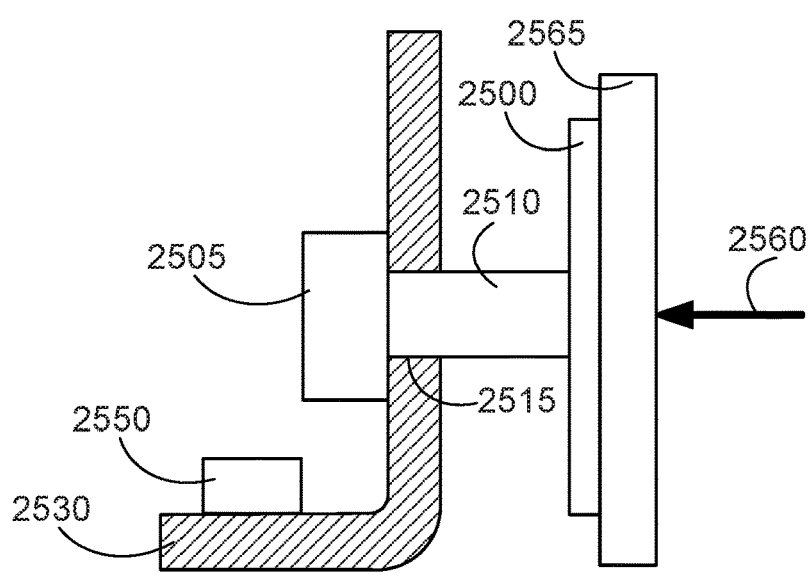
FIG. 25 is a side view of a Hall effect sensor for a bumper.

Referring to FIG. 25, a backing 2500 of a bumper (e.g., the bumper 200) can include a magnet 2505 attached to a post 2510 that goes through a hole 2515 of a robot body 2530. The magnet 2505 is located an initial distance from a Hall effect sensor 2550 attached to the robot body 2530. The Hall effect sensor 2550 generates an electrical signal in response to a strength of a magnetic field produced by the magnet 2505 at the location of the Hall effect sensor 2550. In one example, a force 2560 on a skin 2565 of the bumper transfers to the backing 2500, causing the backing 2500 to move relative to the body 2530. Thus, the distance between the magnet 2505 and the Hall effect sensor 2550 varies with the movement of the backing 2500. As a result, the force 2560 causes the electrical signal generated by the Hall effect sensor 2550 to vary proportionally to an amount of displacement of the magnet 2505 relative to the Hall effect sensor 2550.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment.

Operations associated with controlling the robots described herein can be performed by one or more programmable processors executing one or more computer programs to perform the functions described herein. Control over all or part of the robots described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:
1. An autonomous mobile robot comprising:
  a body movable relative to a surface;
  a bumper mounted on the body and movable relative to the body, the bumper having a front side, a lateral side, and a corner, the bumper comprising:
    a backing including a forward portion at the front side of the bumper, a lateral portion at the lateral side of the bumper, and a corner portion at the corner of the bumper, the corner portion connecting the forward portion and the lateral portion and being configured to inhibit a force applied to the forward portion of the backing from transferring to the lateral portion and to inhibit a force applied to the lateral portion of the backing from transferring to the forward portion;
a sensor system including a first sensor at the corner of the bumper to detect a force applied to the corner of the bumper; and
a controller operable to move the body based on an electrical signal from the sensor system.

2. The robot of claim 1, wherein the sensor system further comprises
a second sensor near the front side of the bumper to detect the force applied to the front side of the bumper, and
a third sensor near the lateral side of the bumper to detect the force applied to the lateral side of the bumper.

3. The robot of claim 2, wherein the controller is configured to
determine a location of a force applied to the bumper based on electrical signals of the first, second, and third sensors of the sensor system; and
initiate moving of the body based on the location of the force.

4. The robot of claim 3, wherein the controller is configured to determine the location of the force applied to the bumper to be at the corner of the bumper based on an electrical signal from the third sensor being larger than an electrical signal from the first sensor and an electrical signal from the second sensor.

5. The robot of claim 3, wherein the electrical signals vary linearly with movement of the bumper.

6. The robot of claim 1, wherein an angle between the front side of the bumper and the lateral side of the bumper is between 75 and 105 degrees.

7. The robot of claim 1, wherein the bumper forms a partially frontally rectangular shape.

8. The robot of claim 1, wherein the backing comprises rigid regions interconnected by flexible regions to inhibit a force applied to the forward portion of the backing from transferring to the corner and to inhibit a force applied to the lateral portion of the backing from transferring to the corner portion.

9. The robot of claim 1, wherein the corner portion of the backing is thinner than the lateral portion of the backing and the forward portion of the backing.

10. The robot of claim 1, wherein:
the corner portion comprises a corner segment and a connecting segment connecting the corner segment to the lateral portion of the backing, the connecting segment having a length larger than a distance between the corner segment and the lateral portion so as to inhibit the force applied to the lateral side from transferring to the corner segment, and
the first sensor includes a portion attached to the corner segment of the backing.

11. The robot of claim 10, wherein the connecting segment is concave relative to a shape of the bumper.

12. The robot of claim 1, wherein:
the corner portion comprises a connecting segment connecting a corner segment to the forward portion, the connecting segment having a length larger than a distance between the corner segment and the forward portion so as to inhibit the force applied to the forward portion from transferring to the corner portion, and
the first sensor includes a portion attached to the corner segment of the backing.

13. The robot of claim 1, wherein the first sensor includes a first portion attached to the body and a second portion attached to the corner portion, the second portion of the first sensor being movable relative to the first portion of the first sensor to generate the electrical signal in response to contact between the corner of the bumper and an obstacle.

14. The robot of claim 1, wherein the first sensor comprises a capacitive sensor having a first plate attached to the body and a second plate attached to the backing.

15. The robot of claim 14, wherein at least one of the first plate or the second plate is non-planar.

16. The robot of claim 1, wherein the autonomous mobile robot is an autonomous cleaning robot configured to perform a cleaning operation on the surface.

17. The robot of claim 1, wherein the autonomous mobile robot is an autonomous cleaning robot configured to perform a cleaning operation on the surface.

18. An autonomous mobile robot comprising:
a body movable relative to a surface;
a bumper mounted on the body and vertically displaceable relative to the body;
a sensor system including a sensor having a first portion on the body and a second portion on the bumper, the sensor configured to
detect an obstacle in response to horizontal displacement of the second portion of the sensor relative to the first portion of the sensor when the bumper contacts the obstacle;
detect an overhead object in response to vertical displacement of the second portion of the sensor relative to the first portion of the sensor when the bumper contacts the overhead object; and
a controller operable to move the body based on an electrical signal from the sensor system to avoid the overhead object.

19. The robot of claim 18, wherein:
the sensor comprises a capacitive sensor;
the first portion comprises a first plate of the capacitive sensor;
the second portion comprises a second plate of the capacitive sensor; and
the electrical signal varies proportionally to an amount of displacement of the first plate relative to the second plate.

20. The robot of claim 19, wherein the electrical signal is indicative of a change in capacitance of the capacitive sensor, the change in capacitance varying with a vertical distance between the first plate and the second plate.

21. The robot of claim 18, wherein the second portion of the sensor is slidable relative to the first portion of the sensor, and the second portion of the sensor is displaceable toward or away from the first portion of the sensor.

* * * * *